(12) United States Patent
Nakamura et al.

(10) Patent No.: US 10,825,434 B2
(45) Date of Patent: *Nov. 3, 2020

(54) ELECTRONIC MUSICAL INSTRUMENT, ELECTRONIC MUSICAL INSTRUMENT CONTROL METHOD, AND STORAGE MEDIUM

(71) Applicant: CASIO COMPUTER CO., LTD., Tokyo (JP)

(72) Inventors: Atsushi Nakamura, Tokyo (JP); Masaru Setoguchi, Tokyo (JP); Makoto Danjyo, Saitama (JP); Fumiaki Ota, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,861

(22) Filed: Apr. 15, 2019

(65) Prior Publication Data

US 2019/0318712 A1 Oct. 17, 2019

(30) Foreign Application Priority Data

Apr. 16, 2018 (JP) .................. 2018-078110

(51) Int. Cl.
*G10G 3/00* (2006.01)
*G10H 1/00* (2006.01)
(Continued)

(52) U.S. Cl.
CPC .......... *G10H 1/0033* (2013.01); *G06N 20/00* (2019.01); *G10H 1/366* (2013.01); *G10H 2210/325* (2013.01)

(58) Field of Classification Search
CPC ................ G10H 1/0033; G10H 1/366; G10H 2210/325; G06N 20/00
(Continued)

(56) References Cited

U.S. PATENT DOCUMENTS 6,337,433 B1* 1/2002 Nishimoto .............. A63J 17/00
84/464 A
8,008,563 B1* 8/2011 Hastings .............. G09B 15/023
84/470 R
(Continued)

FOREIGN PATENT DOCUMENTS

JP H04-238384 A 8/1992
JP H06-332449 A 12/1994
(Continued)

OTHER PUBLICATIONS

Japanese Office Action dated May 28, 2019, in a counterpart Japanese patent application No. 2018-078110. (A machine translation (not reviewed for accuracy) attached.).

(Continued)

*Primary Examiner* — Jianchun Qin

(74) *Attorney, Agent, or Firm* — Chen Yoshimura LLP

(57) ABSTRACT

An electronic musical instrument in one aspect of the disclosure includes a keyboard, a processor and a memory that stores musical piece data that includes data of a vocal part, the vocal part including at least first and second notes together with associated first and second lyric parts that are to be successively played at the first and second timings, respectively, wherein if while a digitally synthesized first signing voice corresponding to the first note is being output, a user specifies, via keyboard, a third pitch that is different from the first and second notes prior to the arrival of the second timing, the at least one processor synthesizes a modified first singing voice having the third pitch in accordance with the data of the first lyric part, and causes the digitally synthesized modified first singing voice to be audibly output at the third timing.

15 Claims, 15 Drawing Sheets

(51) Int. Cl.
  *G06N 20/00* (2019.01)
  *G10H 1/36* (2006.01)
(58) Field of Classification Search
  USPC .......................................................... 84/461
  See application file for complete search history.

(56) References Cited

U.S. PATENT DOCUMENTS

| | | | |
|---|---|---|---|
| 2002/0017187 A1* | 2/2002 | Takahashi | G09B 15/023 |
| | | | 84/478 |
| 2003/0009344 A1* | 1/2003 | Kayama | G10L 13/06 |
| | | | 704/500 |
| 2005/0257667 A1 | 11/2005 | Nakamura | |
| 2014/0006031 A1* | 1/2014 | Mizuguchi | G10L 13/04 |
| | | | 704/260 |
| 2017/0140745 A1 | 5/2017 | Nayak et al. | |
| 2018/0277075 A1* | 9/2018 | Nakamura | G10H 1/46 |
| 2018/0277077 A1* | 9/2018 | Nakamura | G10H 1/38 |
| 2019/0096372 A1* | 3/2019 | Setoguchi | G10H 1/0016 |
| 2019/0096379 A1 | 3/2019 | Iwase | |
| 2019/0198001 A1* | 6/2019 | Danjyo | G09B 15/00 |
| 2019/0318715 A1* | 10/2019 | Danjyo | G10H 1/0066 |
| 2019/0392798 A1* | 12/2019 | Danjyo | G10H 1/366 |
| 2019/0392799 A1* | 12/2019 | Danjyo | G10H 1/0008 |
| 2019/0392807 A1* | 12/2019 | Danjyo | G10H 1/36 |

FOREIGN PATENT DOCUMENTS

| | | |
|---|---|---|
| JP | 2005-331806 A | 12/2005 |
| JP | 2014-10190 A | 1/2014 |
| JP | 2014-62969 A | 4/2014 |
| JP | 2016-206323 A | 12/2016 |
| JP | 2017-97176 A | 6/2017 |
| JP | 2017-194594 A | 10/2017 |

OTHER PUBLICATIONS

Japanese Office Action dated May 28, 2019, in a counterpart Japanese patent application No. 2018-078113. (Cited in the related U.S. Appl. No. 16/384,883 and a machine translation (not reviewed for accuracy) attached.).
Kei Hashimoto and Shinji Takaki, "Statistical parametric speech synthesis based on deep learning", Journal of the Acoustical Society of Japan, vol. 73, No. 1 (2017), pp. 55-62 (Mentioned in paragraph Nos. 18-19 of the as-filed specification as a concise explanation of relevance.).
U.S. Appl. No. 16/384,883, filed Apr. 15, 2019.

* cited by examiner

| | | | |
|---|---|---|---|
| Header chunk | ChunkID | | Fixed string "MThd" = 0x4d546864 |
| | ChunkSize | | Length of header chunk = 0x00000006 |
| | FormatType | | Format: e.g., 0x0001 |
| | NumberOfTrack | | Number of tracks: e.g., 0x0002 |
| | TimeDivision | | Timebase: e.g., 0x1e0 |
| First track chunk (lyric part) | | ChunkID | Fixed string "MTrk" = 0x4d54726b |
| | | ChunkSize_1 | Length of first track chunk |
| | DeltaTime_1[0] | DeltaTime | Wait time since last event |
| | Event_1[0] | Event | Event |
| | DeltaTime_1[1] | DeltaTime | Wait time since last event |
| | Event_1[1] | Event | Event |
| | ... | ... | |
| | DeltaTime_1[L−1] | DeltaTime | Wait time since last event |
| | Event_1[L−1] | Event | Must have "End of Track" at end of track |
| Second track chunk (accompaniment part) | | ChunkID | Fixed string "MTrk" = 0x4d54726b |
| | | ChunkSize_2 | Length of second track chunk |
| | DeltaTime_2[0] | DeltaTime | Wait time since last event |
| | Event_2[0] | Event | Event |
| | DeltaTime_2[1] | DeltaTime | Wait time since last event |
| | Event_2[1] | Event | Event |
| | ... | ... | |
| | DeltaTime_2[M−1] | DeltaTime | Wait time since last event |
| | Event_2[M−1] | Event | Must have "End of Track" at end of track |

FIG. 6

```
<note default-x="14">
  <pitch>
    <step>E</step>
    <octave>4</octave>
  </pitch>
  <duration>2</duration>
  <voice>1</voice>
  <type>quarter</type>
  <stem default-y="-4">up</stem>
  <lyric default-y="-80" number="1">
    <syllabic>single</syllabic>
    <text font-family="-3 ">Ki</text>
  </lyric>
</note>
```

FIG. 14

ELECTRONIC MUSICAL INSTRUMENT, ELECTRONIC MUSICAL INSTRUMENT CONTROL METHOD, AND STORAGE MEDIUM

BACKGROUND OF THE INVENTION

Technical Field

The present invention relates to an electronic musical instrument that generates a singing voice in accordance with the operation of an operation element on a keyboard or the like, an electronic musical instrument control method, and a storage medium.

Background Art

In one conventional technology, an electronic musical instrument is configured so as to generate a singing voice (vocals) in accordance with the operation of an operation element on a keyboard or the like (for example, see Patent Document 1). This conventional technology includes a keyboard operation element for instructing pitch, a storage unit in which lyric data is stored, an instruction unit that gives instruction to read lyric data from the storage unit, a read-out unit that sequentially reads lyric data from the storage unit when there has been an instruction from the instruction unit, and a sound source that generates a singing voice at a pitch instructed by the keyboard operation element and with a tone color corresponding to the lyric data read by the read-out unit.

RELATED ART DOCUMENTS

Patent Documents

Patent Document 1: Japanese Patent Application Laid-Open Publication No. H06-332449

SUMMARY OF THE INVENTION

However, with conventional technology such as described above, when, for example, attempting to output singing voices corresponding to lyrics in time with the progression of accompaniment data that is output by the electronic musical instrument, if singing voices corresponding to the lyrics are progressively output each time a key is specified by a user no matter which key has been specified, depending on the way the keys were specified by the user, the progression of accompaniment data and singing voices being output may not be in time with one another. For example, in cases where a single measure contains four musical notes for which the respective timings at which sound is generated are mutually distinct, lyrics will run ahead of the progression of accompaniment data when a user specifies more than four pitches within this single measure, and lyrics will lag behind the progression of accompaniment data when a user specifies three or fewer pitches within this single measure.

If lyrics are progressively advanced in this manner each time a user specifies a pitch with a keyboard or the like, the lyrics may, for example, run too far ahead of the accompaniment, or conversely, the lyrics may lag too far behind the accompaniment.

A similar issue exists with respect to the progression of lyrics even when no accompaniment data is output, that is, when only a singing voice is output. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic musical instrument that includes: a performance receiver having a plurality of operation elements to be performed by a user for respectively specifying different pitches of musical notes; a memory that stores musical piece data that includes data of a vocal part, the vocal part including at least first and second notes and respectively associated first and second lyric parts that are to be successively played in the order of the first note and then the second note, wherein the first note has a first pitch and the second note has a second pitch; and at least one processor, wherein the at least one processor performs the following: when the user specifies, via the performance receiver, the first pitch, digitally synthesizing a first singing voice that includes the first lyric part and that has the first pitch in accordance with data of the first note stored in the memory, and causing the digitally synthesized first singing voice to be audibly output; and if the user specifies, via the performance receiver, a third pitch that is different from the second pitch successively after specifying the first pitch, instead of the second pitch of the second note that should have been specified, synthesizing a modified first singing voice that has the third pitch in accordance with data of the first lyric part, and causing the digitally synthesized modified first singing voice to be audibly output without causing the second lyric part of the second note to be audibly output.

In another aspect, the present disclosure provides a method performed by the at least one processor in the above-mentioned electronic musical instrument, the method including the above-mentioned features performed by the at least one processor.

In another aspect, the present disclosure provides a non-transitory computer-readable storage medium having stored thereon a program executable by the above-mentioned at least one processor in the above-mentioned electronic musical instrument, the program causing the at least one processor to perform the above-mentioned features performed by the at least one processor.

According to the present invention, an electronic musical instrument that satisfactorily controls the progression of lyrics can be provided.

It is to be understood that both the foregoing general description and the following detailed description are exemplary and explanatory, and are intended to provide further explanation of the invention as claimed.

BRIEF DESCRIPTION OF THE DRAWINGS

FIG. 6 is a diagram illustrating an example data configuration in the embodiment.

FIG. 14 illustrates an example configuration of lyric control data in the MusicXML format.

DETAILED DESCRIPTION OF EMBODIMENTS

Embodiments of the present invention will be described in detail below with reference to the drawings.

Figure 1:
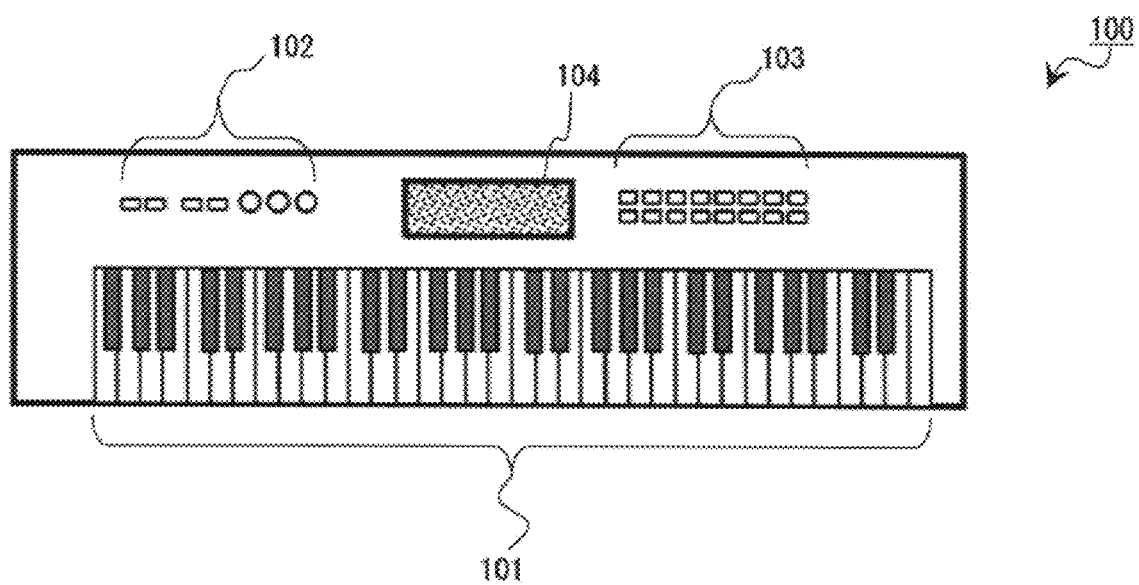
FIG. 1 is a diagram illustrating an example external view of an embodiment of an electronic keyboard instrument of the present invention.

FIG. 1 is a diagram illustrating an example external view of an embodiment of an electronic keyboard instrument 100 of the present invention. The electronic keyboard instrument 100 is provided with, inter alia, a keyboard 101, a first switch panel 102, a second switch panel 103, and a liquid crystal display (LCD) 104. The keyboard 101 is made up of a plurality of keys, including a first operation element and a second operation element, serving as a performance receiver having a plurality of operation elements to be operated by the user. The first switch panel 102 is used to specify various settings such as specifying volume, setting a tempo for song playback, initiating song playback, and playback of accompaniment. The second switch panel 103 is used to make song and accompaniment selections, select tone color, and so on. The liquid crystal display (LCD) 104 displays a musical score and lyrics during the playback of a song, and information relating to various settings. Although not illustrated in the drawings, the electronic keyboard instrument 100 is also provided with a speaker that emits musical sounds generated by playing of the electronic keyboard instrument 100. The speaker is provided at the underside, a side, the rear side, or other such location on the electronic keyboard instrument 100.

Figure 2:
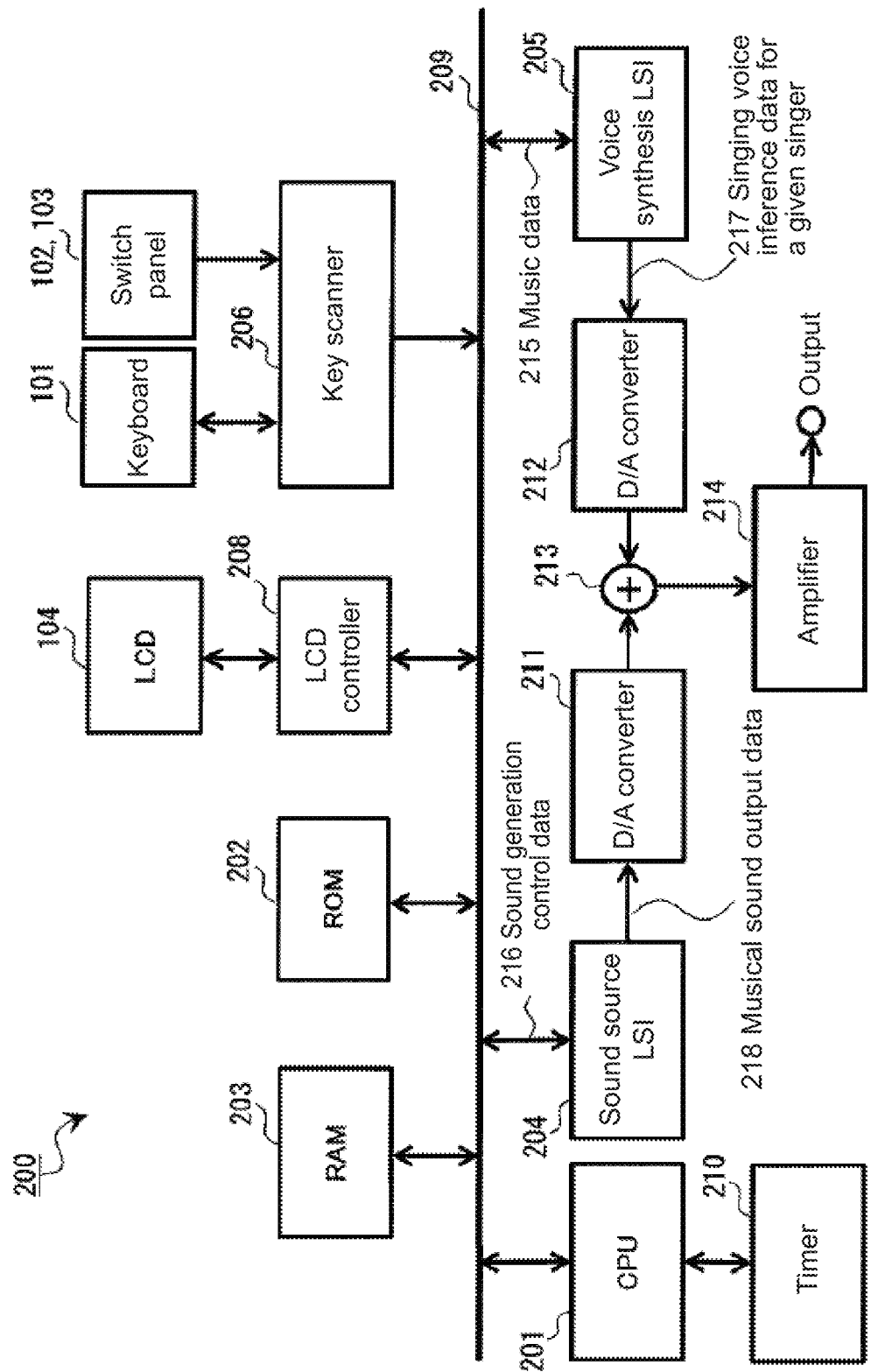
FIG. 2 is a block diagram illustrating an example hardware configuration for an embodiment of a control system of the electronic keyboard instrument.

FIG. 2 is a diagram illustrating an example hardware configuration for an embodiment of a control system 200 in the electronic keyboard instrument 100 of FIG. 1. In the control system 200 in FIG. 2, a central processing unit (CPU) 201, a read-only memory (ROM) 202, a random-access memory (RAM) 203, a sound source large-scale integrated circuit (LSI) 204, a voice synthesis LSI 205, a key scanner 206, and an LCD controller 208 are each connected to a system bus 209. The key scanner 206 is connected to the keyboard 101, to the first switch panel 102, and to the second switch panel 103 in FIG. 1. The LCD controller 208 is connected to the LCD 104 in FIG. 1. The CPU 201 is also connected to a timer 210 for controlling an automatic performance sequence. Musical sound output data 218 output from the sound source LSI 204 is converted into an analog musical sound output signal by a D/A converter 211, and singing voice inference data for a given singer 217 output from the voice synthesis LSI 205 is converted into an analog singing voice sound output signal by a D/A converter 212. The analog musical sound output signal and the analog singing voice sound output signal are mixed by a mixer 213, and after being amplified by an amplifier 214, this mixed signal is output from an output terminal or the non-illustrated speaker.

While using the RAM 203 as working memory, the CPU 201 executes a control program stored in the ROM 202 and thereby controls the operation of the electronic keyboard instrument 100 in FIG. 1. In addition to the aforementioned control program and various kinds of permanent data, the ROM 202 stores music data including lyric data and accompaniment data.

The CPU 201 is provided with the timer 210 used in the present embodiment. The timer 210, for example, counts the progression of automatic performance in the electronic keyboard instrument 100.

In accordance with a sound generation control instruction from the CPU 201, the sound source LSI 204 reads musical sound waveform data from a non-illustrated waveform ROM, for example, and outputs the musical sound waveform data to the D/A converter 211. The sound source LSI 204 is capable of 256-voice polyphony.

When the voice synthesis LSI 205 is given, as music data 215, information relating to lyric text data, pitch, duration, and starting frame by the CPU 201, the voice synthesis LSI 205 synthesizes voice data for a corresponding singing voice and outputs this voice data to the D/A converter 212.

The key scanner 206 regularly scans the pressed/released states of the keys on the keyboard 101 and the operation states of the switches on the first switch panel 102 and the second switch panel 103 in FIG. 1, and sends interrupts to the CPU 201 to communicate any state changes.

The LCD controller 208 is an integrated circuit (IC) that controls the display state of the LCD 104.

Figure 3:
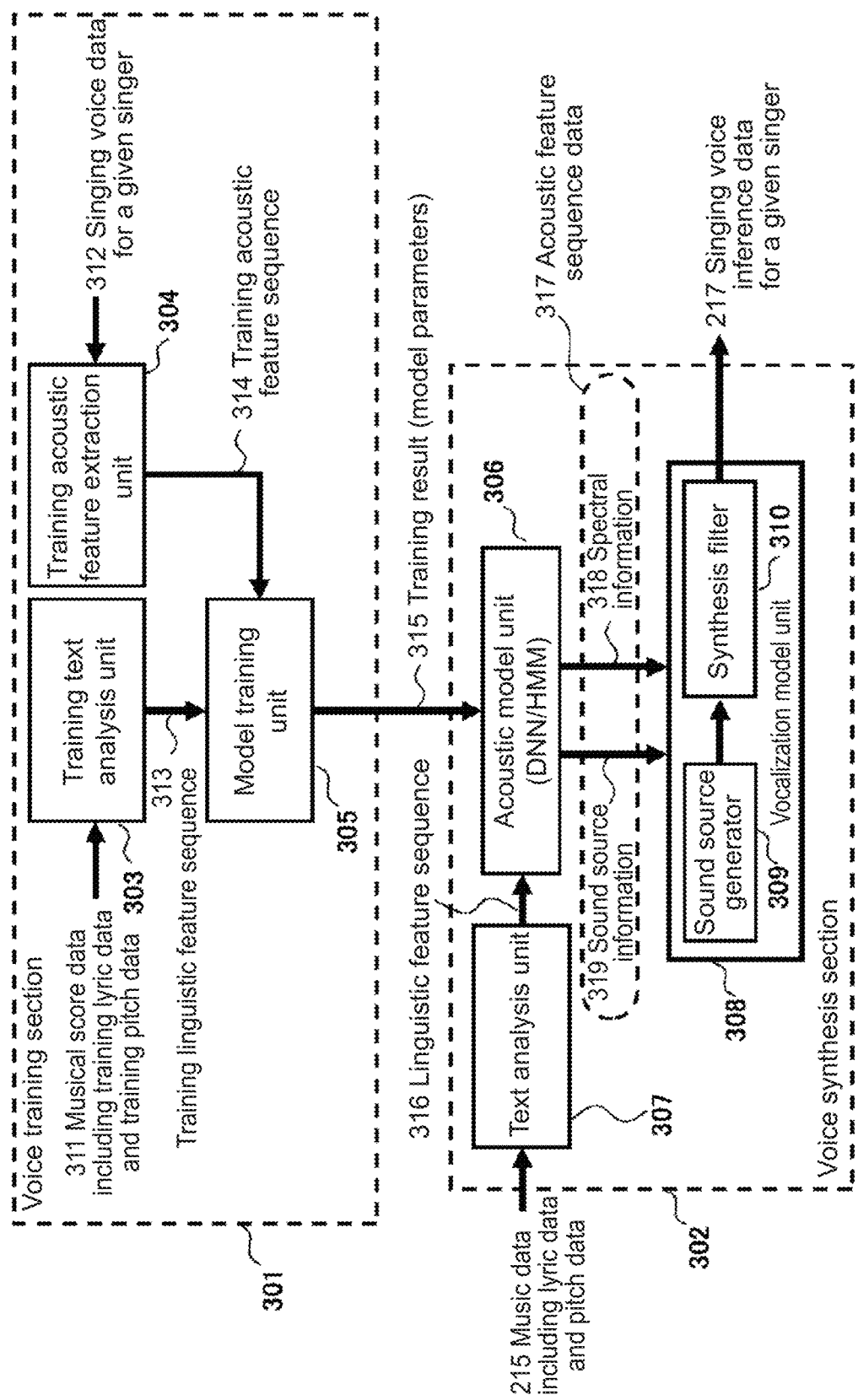
FIG. 3 is a block diagram illustrating an example configuration of a voice synthesis LSI.

FIG. 3 is a block diagram illustrating an example configuration of the voice synthesis LSI 205 in FIG. 2. The voice synthesis LSI 205 is input with music data 215 instructed by the CPU 201 in FIG. 2 as a result of song playback processing, described later. With this, the voice synthesis LSI 205 synthesizes and outputs singing voice inference data for a given singer 217 on the basis of, for example, the "statistical parametric speech synthesis based on deep learning" techniques described in the following document.

Document

Kei Hashimoto and Shinji Takaki, "Statistical parametric speech synthesis based on deep learning", Journal of the Acoustical Society of Japan, vol. 73, no. 1 (2017), pp. 55-62

The voice synthesis LSI 205 includes a voice training section 301 and a voice synthesis section 302. The voice training section 301 includes a training text analysis unit 303, a training acoustic feature extraction unit 304, and a model training unit 305.

The training text analysis unit 303 is input with musical score data 311 including lyric text, pitches, and durations, and the training text analysis unit 303 analyzes this data. In other words, the musical score data 311 includes training lyric data and training pitch data. The training text analysis unit 303 accordingly estimates and outputs a training linguistic feature sequence 313, which is a discrete numerical sequence expressing, inter alia, phonemes, parts of speech, words, and pitches corresponding to the musical score data 311.

The training acoustic feature extraction unit 304 receives and analyzes singing voice data 312 that has been recorded via a microphone or the like when a given singer sang the aforementioned lyric text. The training acoustic feature extraction unit 304 accordingly extracts and outputs a training acoustic feature sequence 314 representing phonetic features corresponding to the singing voice data for a given singer 312.

In accordance with Equation (1) below, the model training unit 305 uses machine learning to estimate an acoustic model $\hat{\lambda}$ with which the likelihood ($P(o|l,\lambda)$) that a training acoustic feature sequence 314 ($o$) will be generated given a training linguistic feature sequence 313 ($l$) and an acoustic model ($\lambda$) is maximized. In other words, a relationship between a linguistic feature sequence (text) and an acoustic feature sequence (voice sounds) is expressed using a statistical model, which here is referred to as an acoustic model.

$$\hat{\lambda}=\arg\max_\lambda P(o|l,\lambda) \quad (1)$$

The model training unit 305 outputs, as training result 315, model parameters expressing the acoustic model A that have been calculated using Equation (1) through the employ of machine learning, and the training result 315 is set in an acoustic model unit 306 in the voice synthesis section 302.

The voice synthesis section 302 includes a text analysis unit 307, an acoustic model unit 306, and a vocalization model unit 308. The voice synthesis section 302 performs statistical voice synthesis processing in which singing voice inference data for a given singer 217, corresponding to music data 215 including lyric text, is synthesized by making predictions using the statistical model, referred to herein as an acoustic model, set in the acoustic model unit 306.

As a result of a performance by a user made in concert with an automatic performance, the text analysis unit 307 is input with music data 215, which includes information relating to lyric text data, pitch, duration, and starting frame, specified by the CPU 201 in FIG. 2, and the text analysis unit 307 analyzes this data. The text analysis unit 307 performs this analysis and outputs a linguistic feature sequence 316 expressing, inter alia, phonemes, parts of speech, words, and pitches corresponding to the music data 215.

The acoustic model unit 306 is input with the linguistic feature sequence 316, and using this, the acoustic model unit 306 estimates and outputs an acoustic feature sequence 317 corresponding thereto. In other words, in accordance with Equation (2) below, the acoustic model unit 306 estimates a value ($\hat{o}$) for an acoustic feature sequence 317 at which the likelihood ($P(o|l,\hat{\lambda})$) that an acoustic feature sequence 317 ($o$) will be generated based on a linguistic feature sequence 316 ($l$) input from the text analysis unit 307 and an acoustic model $\hat{\lambda}$ set using the training result 315 of machine learning performed in the model training unit 305 is maximized.

$$\hat{o}=\arg\max_o P(o|l,\hat{\lambda}) \quad (2)$$

The vocalization model unit 308 is input with the acoustic feature sequence 317. With this, the vocalization model unit 308 generates singing voice inference data for a given singer 217 corresponding to the music data 215 including lyric text specified by the CPU 201. The singing voice inference data for a given singer 217 is output from the D/A converter 212, goes through the mixer 213 and the amplifier 214 in FIG. 2, and is emitted from the non-illustrated speaker.

The acoustic features expressed by the training acoustic feature sequence 314 and the acoustic feature sequence 317 include spectral information that models the vocal tract of a person, and sound source information that models the vocal chords of a person. A mel-cepstrum, line spectral pairs (LSP), or the like may be employed for the spectral parameters. A fundamental frequency (F0) indicating the pitch frequency of the voice of a person may be employed for the sound source information. The vocalization model unit 308 includes a sound source generator 309 and a synthesis filter 310. The sound source generator 309 is sequentially input with a sound source information 319 sequence from the acoustic model unit 306. Thereby, the sound source generator 309, for example, generates a sound source signal that periodically repeats at a fundamental frequency (F0) contained in the sound source information 319 and is made up of a pulse train (for voiced phonemes) with a power value contained in the sound source information 319 or is made up of white noise (for unvoiced phonemes) with a power value contained in the sound source information 319. The synthesis filter 310 forms a digital filter that models the vocal tract on the basis of a spectral information 318 sequence sequentially input thereto from the acoustic model unit 306, and using the sound source signal input from the sound source generator 309 as an excitation signal, generates and outputs singing voice inference data for a given singer 217 in the form of a digital signal.

In the present embodiment, in order to predict an acoustic feature sequence 317 from a linguistic feature sequence 316, the acoustic model unit 306 is implemented using a deep neural network (DNN). Correspondingly, the model training unit 305 in the voice training section 301 learns model parameters representing non-linear transformation functions for neurons in the DNN that transform linguistic features into acoustic features, and the model training unit 305 outputs, as the training result 315, these model parameters to the DNN of the acoustic model unit 306 in the voice synthesis section 302.

Normally, acoustic features are calculated in units of frames that, for example, have a width of 5.1 msec, and linguistic features are calculated in phoneme units. Accordingly, the unit of time for linguistic features differs from that for acoustic features. The DNN acoustic model unit 306 is a model that represents a one-to-one correspondence between the input linguistic feature sequence 316 and the output acoustic feature sequence 317, and so the DNN cannot be trained using an input-output data pair having differing units of time. Thus, in the present embodiment, the correspondence between acoustic feature sequences given in frames and linguistic feature sequences given in phonemes is established in advance, whereby pairs of acoustic features and linguistic features given in frames are generated.

Figure 4:
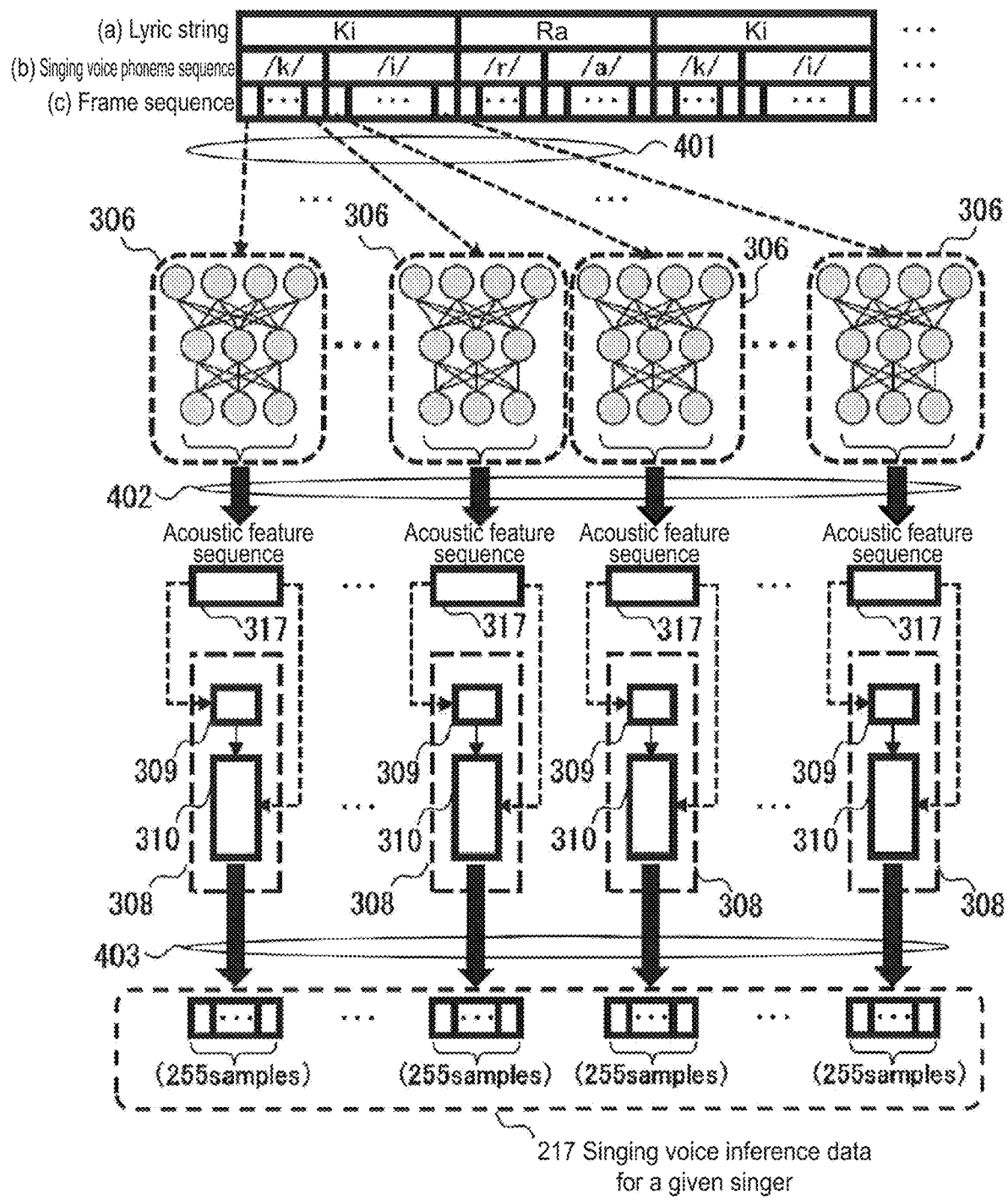
FIG. 4 is a diagram for explaining the operation of the voice synthesis LSI.

FIG. 4 is a diagram for explaining the operation of the voice synthesis LSI 205, and illustrates the aforementioned correspondence. For example, when the singing voice phoneme sequence (linguistic feature sequence)/k/ /i/ /r/ /a/ /k/ /i/ ((b) in FIG. 4) corresponding to the lyric string "Ki Ra Ki" ((a) in FIG. 4) at the beginning of a song has been acquired, this linguistic feature sequence is mapped to an acoustic feature sequence given in frames ((c) in FIG. 4) in a one-to-many relationship (the relationship between (b) and (c) in FIG. 4). It should be noted that because linguistic features are used as inputs to the DNN of the acoustic model unit 306, it is necessary to express the linguistic features as numerical data. Numerical data obtained by concatenating binary data (0 or 1) or continuous values responsive to contextual questions such as "Is the preceding phoneme /a/?" and "How many phonemes does the current word contain?" is prepared for the linguistic feature sequence for this reason.

The model training unit 305 in the voice training section 301 in FIG. 3, as depicted using the group of dashed arrows 401 in FIG. 4, trains the DNN of the acoustic model unit 306 by sequentially passing, in frames, pairs of individual phonemes in a training linguistic feature sequence 313 phoneme sequence (corresponding to (b) in FIG. 4) and individual frames in a training acoustic feature sequence 314 (corresponding to (c) in FIG. 4) to the DNN. The DNN of the acoustic model unit 306, as depicted using the groups of gray circles in FIG. 4, contains neuron groups each made up of an input layer, one or more middle layer, and an output layer.

During voice synthesis, a linguistic feature sequence 316 phoneme sequence (corresponding to (b) in FIG. 4) is input to the DNN of the acoustic model unit 306 in frames. The DNN of the acoustic model unit 306, as depicted using the group of heavy solid arrows 402 in FIG. 4, consequently outputs an acoustic feature sequence 317 in frames. For this reason, in the vocalization model unit 308, the sound source information 319 and the spectral information 318 contained in the acoustic feature sequence 317 are respectively passed to the sound source generator 309 and the synthesis filter 310 and voice synthesis is performed in frames.

The vocalization model unit 308, as depicted using the group of heavy solid arrows 403 in FIG. 4, consequently outputs 225 samples, for example, of singing voice inference data for a given singer 217 per frame. Because each frame has a width of 5.1 msec, one sample corresponds to 5.1 msec÷225≈0.0227 msec. The sampling frequency of the singing voice inference data for a given singer 217 is therefore 1/0.0227≈44 kHz (kilohertz).

The DNN is trained so as to minimize squared error. This is computed according to Equation (3) below using pairs of acoustic features and linguistic features denoted in frames.

$$\hat{\lambda} = \arg\min_\lambda \tfrac{1}{2} \Sigma_{t=1}^T \|o_t - g_\lambda(l_t)\|^2 \quad (3)$$

In this equation, $o_t$ and $l_t$ respectively represent an acoustic feature and a linguistic feature in the $t^{th}$ frame t, $\hat{\lambda}$ represents model parameters for the DNN of the acoustic model unit 306, and $g_\lambda(\cdot)$ is the non-linear transformation function represented by the DNN. The model parameters for the DNN are able to be efficiently estimated through back-propagation. When correspondence with processing within the model training unit 305 in the statistical voice synthesis represented by Equation (1) is taken into account, DNN training can represented as in Equation (4) below.

$$\hat{\lambda} = \arg\max_\lambda P(o \mid l, \lambda)$$
$$= \arg\max_\lambda \prod_{t=1}^T \mathcal{N}(o_t \mid \tilde{\mu}_t, \tilde{\Sigma}_t) \quad (4)$$

Here, $\tilde{\mu}_t$ is given as in Equation (5) below.

$$\tilde{\mu}_t = g_\lambda(l_t) \quad (5)$$

As in Equation (4) and Equation (5), relationships between acoustic features and linguistic features are able to be expressed using the normal distribution $\mathcal{N}(o_t \mid \hat{\mu}_t, \hat{\Sigma}_t)$, which uses output from the DNN for the mean vector. Normally, in statistical voice synthesis processing employing a DNN, independent covariance matrices are used for linguistic features $l_t$. In other words, in all frames, the same covariance matrix $\tilde{\Sigma}_g$ is used for the linguistic features $l_t$. When the covariance matrix $\tilde{\Sigma}_g$ is an identity matrix, Equation (4) expresses a training process equivalent to that in Equation (3).

As described in FIG. 4, the DNN of the acoustic model unit 306 estimates an acoustic feature sequence 317 for each frame independently. For this reason, the obtained acoustic feature sequences 317 contain discontinuities that lower the quality of voice synthesis. Accordingly, a parameter generation algorithm that employs dynamic features, for example, is used in the present embodiment. This allows the quality of voice synthesis to be improved.

Figure 5A:
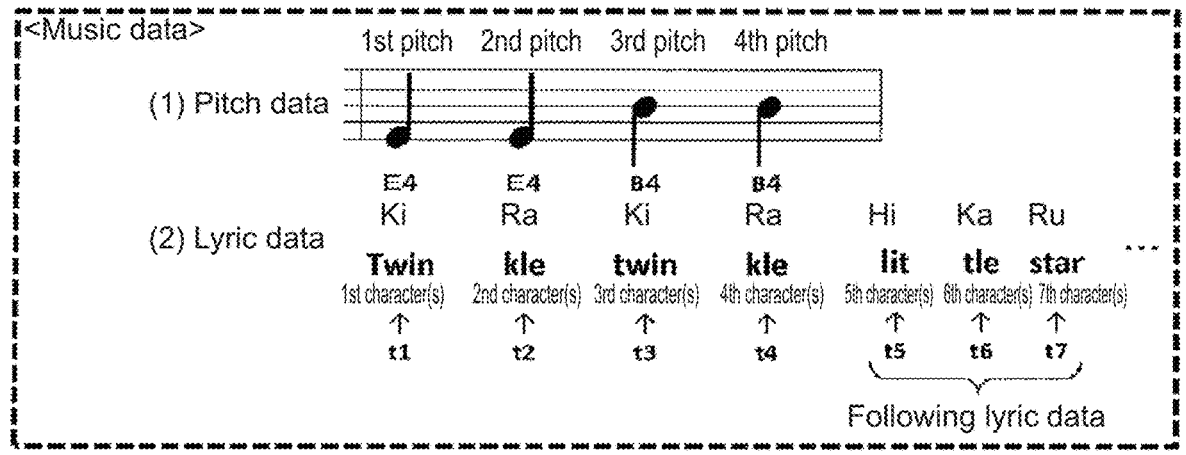
FIGS. 5A, 5B and 5C are diagrams for explaining lyric control techniques.
Figure 5B:
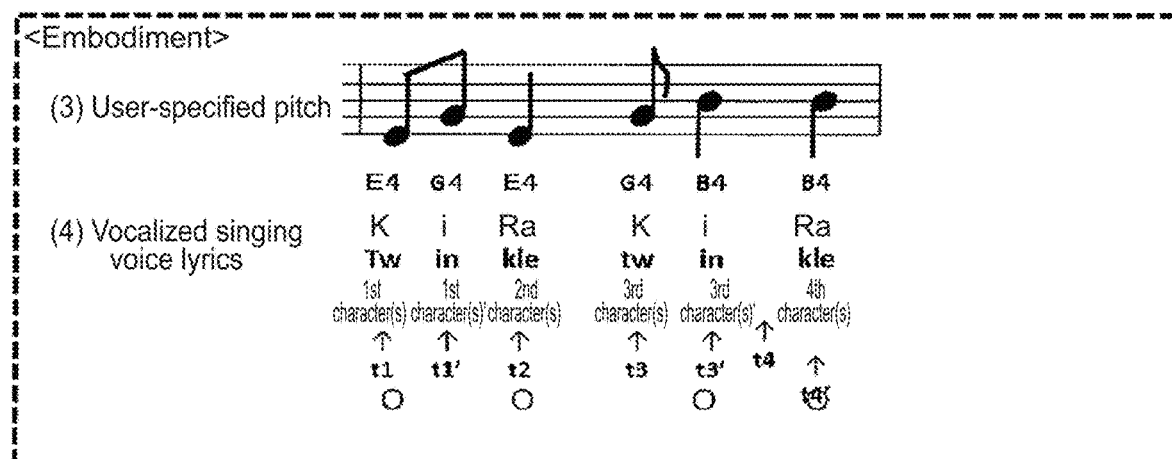
Figure 5C:
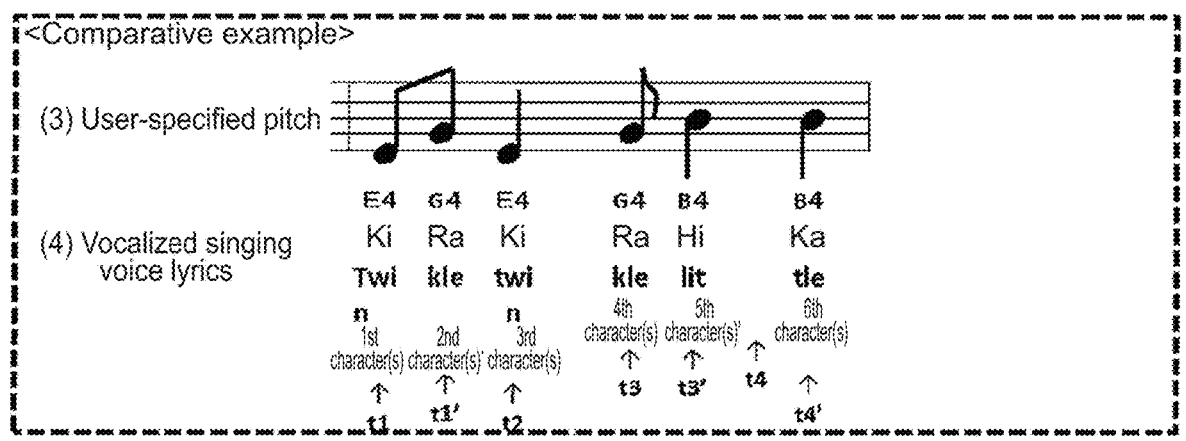

Detailed description follows regarding the operation of the present embodiment, configured as in the examples of FIGS. 1 to 3. FIGS. 5A through 5C are diagrams for explaining lyric control techniques. FIG. 5A is a diagram illustrating a relationship between a melody and lyric text that progresses in accordance with an automatic performance. For example, the music data at the beginning of the song mentioned above includes the lyric characters (lyric data) "Ki/Twin" (first character(s) or first lyric part), "Ra/kle" (second character(s) or second lyric part), "Ki/twin" (third character(s)/lyric part), and "Ra/kle" (fourth character(s)/lyric part); timing information for t1, t2, t3, and t4, at which characters in the lyrics are output; and pitch data for the characters in the lyrics, e.g., the melody pitches E4 (first pitch), E4 (second pitch), B4 (third pitch), and B4 (fourth pitch). The timings t5, t6, t7 subsequent to t4 are associated with the characters in the lyrics "Hi/lit" (fifth character(s)), "Ka/tle" (sixth character(s)), and "Ru/star" (seventh character(s)).

The timings t1, t2, t3, t4 in FIG. 5B, for example, are vocalization timings t1, t2, t3, t4 in FIG. 5A at which a user is supposed to specify the corresponding voice sound (by operating the keyboard). Suppose that the user correctly pressed, twice, a key having the same pitch E4 on the keyboard 101 in FIG. 1 as the first pitch E4 included in the music data at timings t1 and t2, which correspond to original (i.e., correct) vocalization timings. In this case, the CPU 201 in FIG. 2 outputs, to the voice synthesis LSI 205 in FIG. 2, music data 215 including the lyrics "Ki/Twin" (the first character(s)) at the timing t1 and "Ra/kle" (the second character(s)) at the timing t2, information indicating the pitch E4 specified by the user at each of the timings t1 and t2, and information indicating, for example, respective durations of quarter note length. Consequently, the voice synthesis LSI 205 outputs, at the first pitch (a specified pitch) E4 and the second pitch (a specified pitch) E4, respectively, singing voice inference data for a given singer 217 of quarter note length that corresponds to the lyrics "Ki/Twin" (the first character(s)) and "Ra/kle" (the second character(s)) at timings t1 and t2. The "o" evaluation markings at timings t1 and t2 indicate that vocalization (i.e., machine emulated electronic vocalization) was correctly performed in conformance with the pitch data and the lyric data included in the music data.

The following control is performed in cases where, at any one of the original vocalization timings, a user has pressed a key on the keyboard 101 in FIG. 1 to specify a pitch at this timing, and the pitch that was specified does not match the pitch that should have been specified. At this timing, the CPU 201 in FIG. 2 controls the progression of lyrics and the progression of automatic accompaniment such that a singing voice that corresponds to the character(s) coming after the character(s) corresponding to the pitch that should have been specified is not output. Then, when a pitch specified by the user key press matches the pitch that should have been specified, the CPU 201 resumes the progression of lyrics and the progression of automatic accompaniment.

For example, in FIG. 5B, consider the case where the pitch G4 specified by a user pressing a key on the keyboard 101 in FIG. 1 at timing t3, which corresponds to an original (correct) vocalization timing, does not match the third pitch B4 that should have been vocalized at timing t3. In this case, although "Ki/twin" (the third character(s)) may be output at timing t3, the CPU 201 in FIG. 2 controls the progression of lyrics and the progression of automatic accompaniment such that any singing voice corresponding to the character(s) "Ra/kle" (the fourth character(s)), which corresponds to the fourth pitch that should be specified next following the third pitch B4 (the fourth pitch that should be specified at timing t4), or later is not output. Alternatively, the CPU 201 may perform control such that sound for "Ki/twin" (the third character(s)) is produced at timing t3 in FIG. 5B. In this case, even though a key was specified at a timing at which a specification should have been made, because the key that should have been specified was not specified (another key was mistakenly pressed), no singing voice is output.

While the progression of lyrics and the progression of automatic accompaniment are being controlled in the manner described above such that no singing voice is output, when a pitch specified by a user key press matches the pitch that should have been specified, the CPU 201 resumes the progression of lyrics and the progression of automatic accompaniment. For example, after the progression of lyrics and the progression of automatic accompaniment has been stopped at timing t3 in FIG. 5B, if the user specifies the pitch B4 at a timing t3', which matches the third pitch B4 that should have been specified, the CPU 201 will output the "i/in" (third character(s)') singing voice in the "Ki/twin" (the third character(s)) lyric data corresponding to the third pitch B4, for which sound was supposed to be produced at timing t3, and resumes the progression of lyrics and the progression of automatic accompaniment.

When the progression of lyrics and the progression of automatic accompaniment has been resumed as described above, the vocalization timing t4 for the "Ra/kle" (the fourth character(s)) lyric data that is to be vocalized next following vocalization of the "i/in" (the third character(s)') singing voice in the "Ki/twin" (the third character(s)) lyric data that was resumed at timing t3' in FIG. 5B, for example, is shifted to t4' from the original (correct) vocalization timing t4. The amount that the vocalization timing t4 is shifted is commensurate to the shift of the resumed vocalization timing from t3 to t3'.

Cases where the pitch that was specified does not match the pitch that should have been specified encompass cases where there is no key press corresponding to a timing at which a specification should have been made. In other words, although not illustrated in FIG. 5, in cases where no key on the keyboard 101 in FIG. 1 is pressed and no pitch is specified at one of the original vocalization timings, the progression of lyrics and the progression of automatic accompaniment is controlled such that a singing voice that corresponds to the character(s) (second character(s)) coming after the character(s) (first character(s)) corresponding to the pitch that should have been vocalized is not output.

Timing t3 in FIG. 5C is used to describe control operation if the above-described control operation of the present embodiment were not performed in cases where, at timing t3, which corresponds to an original vocalization timing, the pitch G4 specified by a user key press does not match the third pitch B4 that should have been specified at timing t3. If the above-described control operation of the present embodiment were not performed, "Ra/kle" (the fourth character(s)) will be vocalized at timing t3 in FIG. 5C. "Ra/kle" (the fourth character(s)) comes after "Ki/twin" (the third character(s)), which is what should be vocalized at timing t3. In contrast to the present embodiment, there is thus an inappropriate progression of lyrics. In other words, "Ra/kle" (the fourth character(s)), for which sound should be produced at timing t4, is produced at timing t3 ahead of timing t4.

In this way, in cases where a user has not specified the correct pitch matching the pitch that should have been specified at an original vocalization timing, the progression of lyrics and the progression of automatic accompaniment fall out of time with one another if the control operation of the present embodiment is not performed, and the user must correct the progression of lyrics each time this happens. However, in the present embodiment, the progression of lyrics and the progression of automatic accompaniment are stopped until the user specifies the correct pitch matching the pitch that should have been specified. This enables natural lyric progression in time with a user performance.

If, at a timing at which no original vocalization timing comes, a user has performed a key press operation on a key (operation element) on the keyboard 101 in FIG. 1 and the pitch specified thereby does not match the pitch that should be specified next, the CPU 201 in FIG. 2 instructs the pitch of the singing voice of the singing voice inference data for a given singer 217 being output from the voice synthesis LSI 205 to be changed to the pitch specified by this performance operation. Consequently, at this timing at which no original vocalization timing comes, the voice synthesis LSI 205 in FIGS. 2 and 3 changes the pitch of the singing voice inference data for a given singer 217 being vocalized to the pitch specified by the CPU 201.

That is, in cases where a first user operation has been performed on a first operation element such that a singing voice corresponding to a first character(s) indicated by lyric data included in music data is output at a first pitch, the CPU 201 receives first operation information that indicates "note on" resulting from the first user operation, and, based on the first operation information, the CPU 201 outputs the singing voice corresponding to the first character(s) at the first pitch.

In cases where a second user operation has been performed on an operation element for a pitch different than the first pitch and the second pitch among the plurality of operation elements while the singing voice corresponding to the first character(s) and the first pitch is being output and prior to the arrival of the second timing, the CPU 201 receives second operation information that indicates "note on" resulting from the second user operation, and, based on the second operation information, the CPU 201 outputs, at the pitch that is different than the first pitch and the second pitch, the singing voice corresponding to the first character(s) being output without outputting a singing voice corresponding to the second character(s).

Suppose that a user presses the key on the keyboard 101 in FIG. 1 for the pitch G4 at, for example, timing t1' in FIG. 5B, at which none of the original vocalization timings t1, t2, t3, t4 come. In this case, the CPU 201 determines that the specified pitch G4 does not match the second pitch E4 corresponding to the "Ra/kle" (the second character(s)) lyric data that should be specified subsequent thereto (at timing t2). Consequently, the CPU 201 outputs, to the voice synthesis LSI 205 in FIG. 2, music data 215 expressing pitch data that instructs the pitch of the singing voice inference data for a given singer 217 for "Ki/Twin" (the first character(s)) being output from the voice synthesis LSI 205, which up to this point was the first pitch E4, to be changed to the pitch G4 specified by the performance operation, and that vocalization of the singing voice inference data for a given singer 217 is to be continued. Consequently, at timing t1', the voice synthesis LSI 205 in FIGS. 2 and 3 changes the pitch of the singing voice inference data for a given singer 217 for the "i/in" (first character(s)') in the "Ki/Twin" (the first character(s)) lyric data being vocalized, which up to this point was the first pitch E4, to the pitch G4 specified by the CPU 201 and continues vocalizing the singing voice inference data for a given singer 217.

Timing t1' in FIG. 5C is used to describe control operation if the above-described control operation of the present embodiment were not performed in cases where, at timing t1', which is not an original vocalization timing, a user presses a key on the keyboard 101 in FIG. 1. If the control operation of the present embodiment were not performed, the "Ra/kle" (the second character(s)) lyric data will be vocalized at timing t1' in FIG. 5C. Ra/kle" (the second character(s)) lyric data should be vocalized at timing t2, which comes after timing t1'.

In this way, if the control operation of the present embodiment is not performed, the lyrics will steadily advance in cases where a pitch specified by the user at a timing other than an original vocalization timing does not match a pitch that is to be specified. This results in an unnatural-sounding progression. However, in the present embodiment, the pitch being vocalized in accordance with the singing voice inference data for a given singer 217 being vocalized from the original timing immediately before this timing is able to be changed to the pitch specified by the user and continue being vocalized. In this case, the pitch of singing voice inference data for a given singer 217 corresponding to the "Ki/Twin" (the first character(s)) lyric data vocalized at, for example, the original song playback timing t1 in FIG. 5B is heard to continuously change to the pitch of the new key press at the key press timing t1' without the singing voice inference data for a given singer 217 cutting out. This enables lyric progression to proceed naturally in the present embodiment.

Although not illustrated in FIG. 5, consider a case where, at a timing at which no original vocalization timing comes, a user specifies the same pitch as the pitch corresponding to lyric data that is to be vocalized next. In this case, the CPU 201 may perform control such that the progression of lyrics and the progression of automatic accompaniment are immediately advanced (made to jump ahead) to the timing of the singing voice that is to be vocalized next.

In other words, while accompaniment data stored in the memory is being output from the sound source LSI 204 based on an instruction from the CPU 201 and singing voice data corresponding to the first character(s) is being output from the voice synthesis LSI 205 based on an instruction from the CPU 201, in cases where the CPU 201 determines there to be a match with a second pitch corresponding to a second timing from second operation information received in accordance with a user operation, the voice synthesis LSI 205 outputs singing voice data corresponding to the second character(s) without waiting for the second timing to arrive, whereby the progression of singing voice data is moved forward, and the progression of accompaniment data being output from the sound source LSI 204 is also moved forward in time with the moved-up progression of singing voice data.

Alternatively, when the user performs a performance operation at a timing other than an original vocalization timing and the specified pitch does not match the pitch is to be specified at the next timing, a vocalization corresponding to previously output singing voice inference data for a given singer 217 may be repeated (with the changed pitch). In this case, following the singing voice inference data for a given singer 217 corresponding to the "Ki/Twin" (the first character(s)) lyric data vocalized at, for example, the original song playback timing t1 in FIG. 5B, singing voice inference data for a given singer 217 corresponding to "Ki/Twin" (the first character(s)') due to a new key press at key press timing t1' is heard separately vocalized. Alternatively, control may be such that singing voice inference data for a given singer 217 is not vocalized at timings other than vocalization timings.

FIG. 6 is a diagram illustrating, for the present embodiment, an example data configuration for music data loaded into the RAM 203 from the ROM 202 in FIG. 2. This example data configuration conforms to the Standard MIDI (Musical Instrument Digital Interface) File format, which is one file format used for MIDI files. The music data is configured by data blocks called "chunks". Specifically, the music data is configured by a header chunk at the beginning of the file, a first track chunk that comes after the header chunk and stores lyric data for a lyric part, and a second track chunk that stores performance data for an accompaniment part.

The header chunk is made up of five values: ChunkID, ChunkSize, FormatType, NumberOfTrack, and TimeDivision. ChunkID is a four byte ASCII code "4D 54 68 64" (in base 16) corresponding to the four half-width characters "MThd", which indicates that the chunk is a header chunk. ChunkSize is four bytes of data that indicate the length of the FormatType, NumberOfTrack, and TimeDivision part of the header chunk (excluding ChunkID and ChunkSize). This length is always "00 00 00 06" (in base 16), for six bytes. FormatType is two bytes of data "00 01" (in base 16). This means that the format type is format 1, in which multiple tracks are used. NumberOfTrack is two bytes of data "00 02" (in base 16). This indicates that in the case of the present embodiment, two tracks, corresponding to the lyric part and the accompaniment part, are used. TimeDivision is data indicating a timebase value, which itself indicates resolution per quarter note. TimeDivision is two bytes of data "01 E0" (in base 16). In the case of the present embodiment, this indicates 480 in decimal notation.

The first and second track chunks are each made up of a ChunkID, ChunkSize, and performance data pairs. The performance data pairs are made up of DeltaTime_1[i] and Event_1[i] (for the first track chunk/lyric part), or DeltaTime_2[i] and Event_2[i] (for the second track chunk/accompaniment part). Note that $0 \leq i \leq L$ for the first track chunk/lyric part, and $0 \leq I \leq M$ for the second track chunk/accompaniment part. ChunkID is a four byte ASCII code "4D 54 72 6B" (in base 16) corresponding to the four half-width characters "MTrk", which indicates that the chunk is a track chunk. ChunkSize is four bytes of data that indicate the length of the respective track chunk (excluding ChunkID and ChunkSize).

DeltaTime_1[i] is variable-length data of one to four bytes indicating a wait time (relative time) from the execution time of Event_1[i−1] immediately prior thereto. Similarly, DeltaTime_2[i] is variable-length data of one to four bytes indicating a wait time (relative time) from the execution time of Event_2[i−1] immediately prior thereto. Event_1[i] is a meta event designating the vocalization timing and pitch of a lyric in the first track chunk/lyric part. Event_2[i] is a MIDI event designating "note on" or "note off" or is a meta event designating time signature in the second track chunk/ accompaniment part. In each DeltaTime_1[i] and Event_1[i] performance data pair of the first track chunk/lyric part, Event_1[i] is executed after a wait of DeltaTime_1[i] from the execution time of the Event_1[i−1] immediately prior thereto. The vocalization and progression of lyrics is realized thereby. In each DeltaTime_2[i] and Event_2[i] performance data pair of the second track chunk/accompaniment part, Event_2[i] is executed after a wait of DeltaTime_2[i] from the execution time of the Event_2[i−1] immediately prior thereto. The progression of automatic accompaniment is realized thereby.

Figure 7:
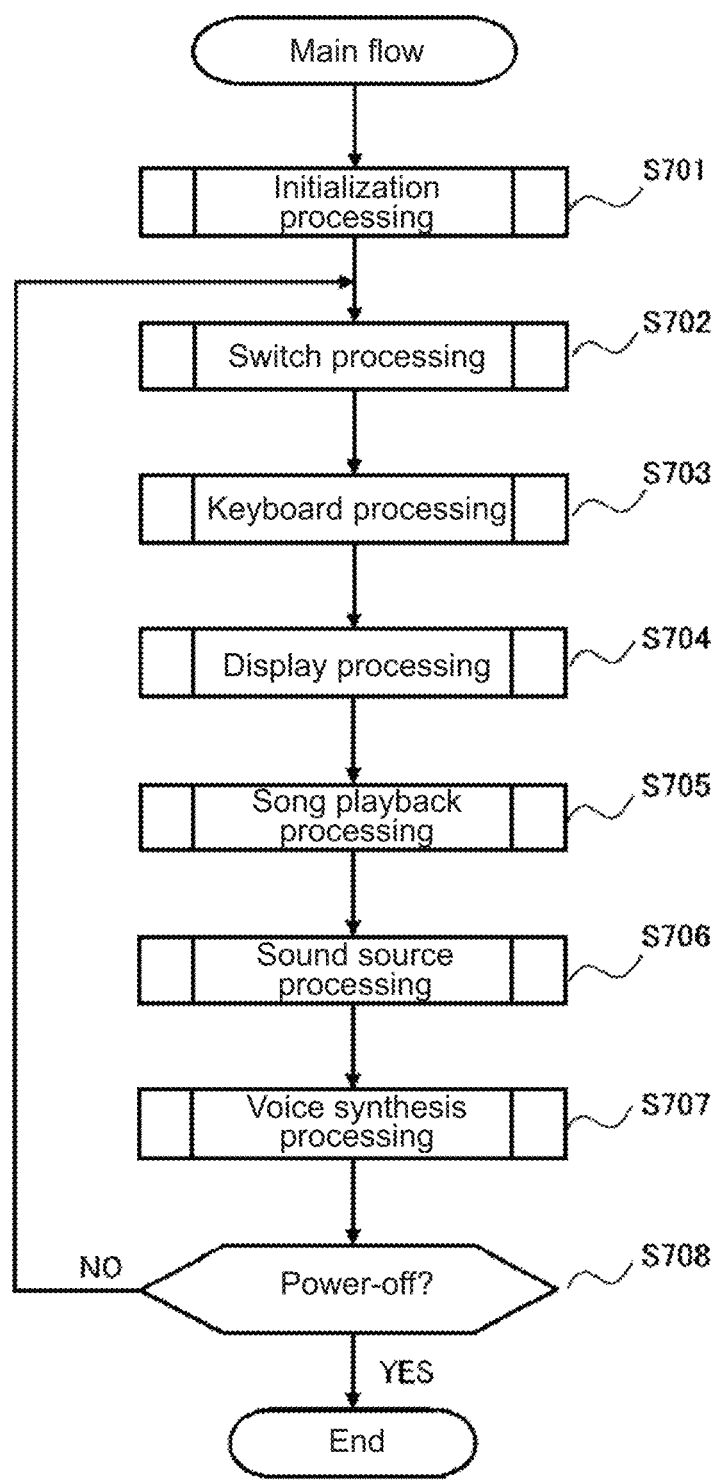
FIG. 7 is a main flowchart illustrating an example of a control process for the electronic musical instrument of the embodiment.

FIG. 7 is a main flowchart illustrating an example of a control process for the electronic musical instrument of the present embodiment. For this control process, for example, the CPU 201 in FIG. 2 executes a control processing program loaded into the RAM 203 from the ROM 202.

After first performing initialization processing (step S701), the CPU 201 repeatedly executes the series of processes from step S702 to step S708.

In this repeat processing, the CPU 201 first performs switch processing (step S702). Here, based on an interrupt from the key scanner 206 in FIG. 2, the CPU 201 performs processing corresponding to the operation of a switch on the first switch panel 102 or the second switch panel 103 in FIG. 1.

Next, based on an interrupt from the key scanner 206 in FIG. 2, the CPU 201 performs keyboard processing (step S703) that determines whether or not any of the keys on the keyboard 101 in FIG. 1 have been operated, and proceeds accordingly. Here, in response to an operation by a user pressing or releasing on any of the keys, the CPU 201 outputs sound generation control data 216 instructing the sound source LSI 204 in FIG. 2 to start generating sound or to stop generating sound.

Next, the CPU 201 processes data that should be displayed on the LCD 104 in FIG. 1, and performs display processing (step S704) that displays this data on the LCD 104 via the LCD controller 208 in FIG. 2. Examples of the data that is displayed on the LCD 104 include lyrics corresponding to the singing voice inference data for a given singer 217 being performed, the musical score for the melody corresponding to the lyrics, and information relating to various settings (see FIGS. 13 and 14, described later).

Next, the CPU 201 performs song playback processing (step S705). In this processing, the CPU 201 performs a control process described in FIG. 5 on the basis of a performance by a user, generates music data 215, and outputs this data to the voice synthesis LSI 205.

Then, the CPU 201 performs sound source processing (step S706). In the sound source processing, the CPU 201 performs control processing such as that for controlling the envelope of musical sounds being generated in the sound source LSI 204.

Then, the CPU 201 performs voice synthesis processing (step S707). In the voice synthesis processing, the CPU 201 controls voice synthesis by the voice synthesis LSI 205.

Finally, the CPU 201 determines whether or not a user has pressed a non-illustrated power-off switch to turn off the power (step S708). If the determination of step S708 is NO, the CPU 201 returns to the processing of step S702. If the determination of step S708 is YES, the CPU 201 ends the control process illustrated in the flowchart of FIG. 7 and powers off the electronic keyboard instrument 100.

Figure 8A:
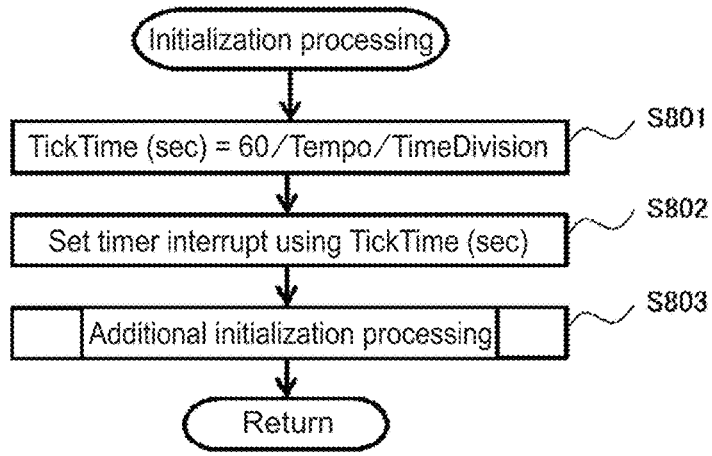
FIGS. 8A, 8B and 8C depict flowcharts illustrating detailed examples of initialization processing, tempo-changing processing, and song-starting processing, respectively.
Figure 8B:
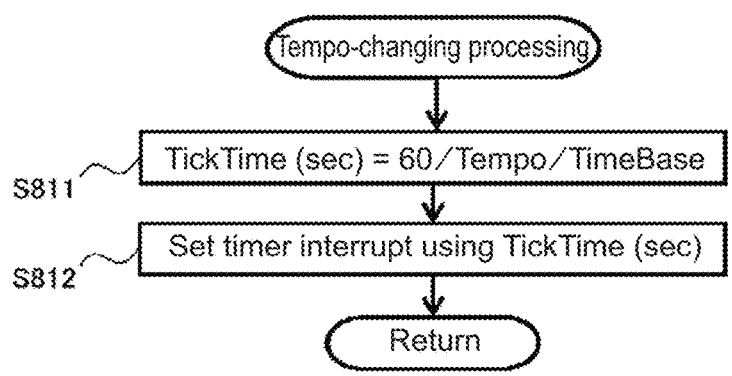
Figure 8C:
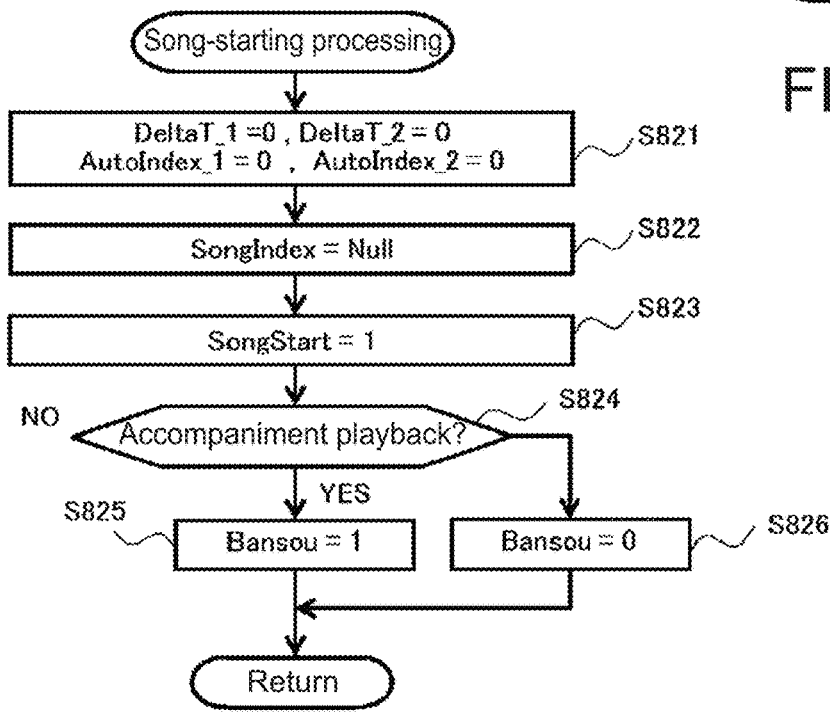

FIGS. 8A to 8C are flowcharts respectively illustrating detailed examples of the initialization processing at step S701 in FIG. 7; tempo-changing processing at step S902 in FIG. 9, described later, during the switch processing of step S702 in FIG. 7; and similarly, song-starting processing at step S906 in FIG. 9 during the switch processing of step S702 in FIG. 7, described later.

First, in FIG. 8A, which illustrates a detailed example of the initialization processing at step S701 in FIG. 7, the CPU 201 performs TickTime initialization processing. In the present embodiment, the progression of lyrics and automatic accompaniment progress in a unit of time called TickTime. The timebase value, specified as the TimeDivision value in the header chunk of the music data in FIG. 6, indicates resolution per quarter note. If this value is, for example, 480, each quarter note has a duration of 480 TickTime. The DeltaTime_1[i] values and the DeltaTime_2[i] values, indicating wait times in the track chunks of the music data in FIG. 6, are also counted in units of TickTime. The actual number of seconds corresponding to 1 TickTime differs depending on the tempo specified for the music data. Taking a tempo value as Tempo (beats per minute) and the timebase value as TimeDivision, the number of seconds per unit of TickTime is calculated using the following equation.

$$\text{TickTime (sec)}=60/\text{Tempo}/\text{TimeDivision} \tag{6}$$

Accordingly, in the initialization processing illustrated in the flowchart of FIG. 8A, the CPU 201 first calculates TickTime (sec) by an arithmetic process corresponding to Equation (6) (step S801). A prescribed initial value for the tempo value Tempo, e.g., 60 (beats per second), is stored in the ROM 202. Alternatively, the tempo value from when processing last ended may be stored in non-volatile memory.

Next, the CPU 201 sets a timer interrupt for the timer 210 in FIG. 2 using the TickTime (sec) calculated at step S801 (step S802). A CPU 201 interrupt for lyric progression and automatic accompaniment (referred to below as an "automatic-performance interrupt") is thus generated by the timer 210 every time the TickTime (sec) has elapsed. Accordingly, in automatic-performance interrupt processing (FIG. 10, described later) performed by the CPU 201 based on an automatic-performance interrupt, processing to control lyric progression and the progression of automatic accompaniment is performed every 1 TickTime.

Then, the CPU 201 performs additional initialization processing, such as that to initialize the RAM 203 in FIG. 2 (step S803). The CPU 201 subsequently ends the initialization processing at step S701 in FIG. 7 illustrated in the flowchart of FIG. 8A.

The flowcharts in FIGS. 8B and 8C will be described later.

Figure 9:
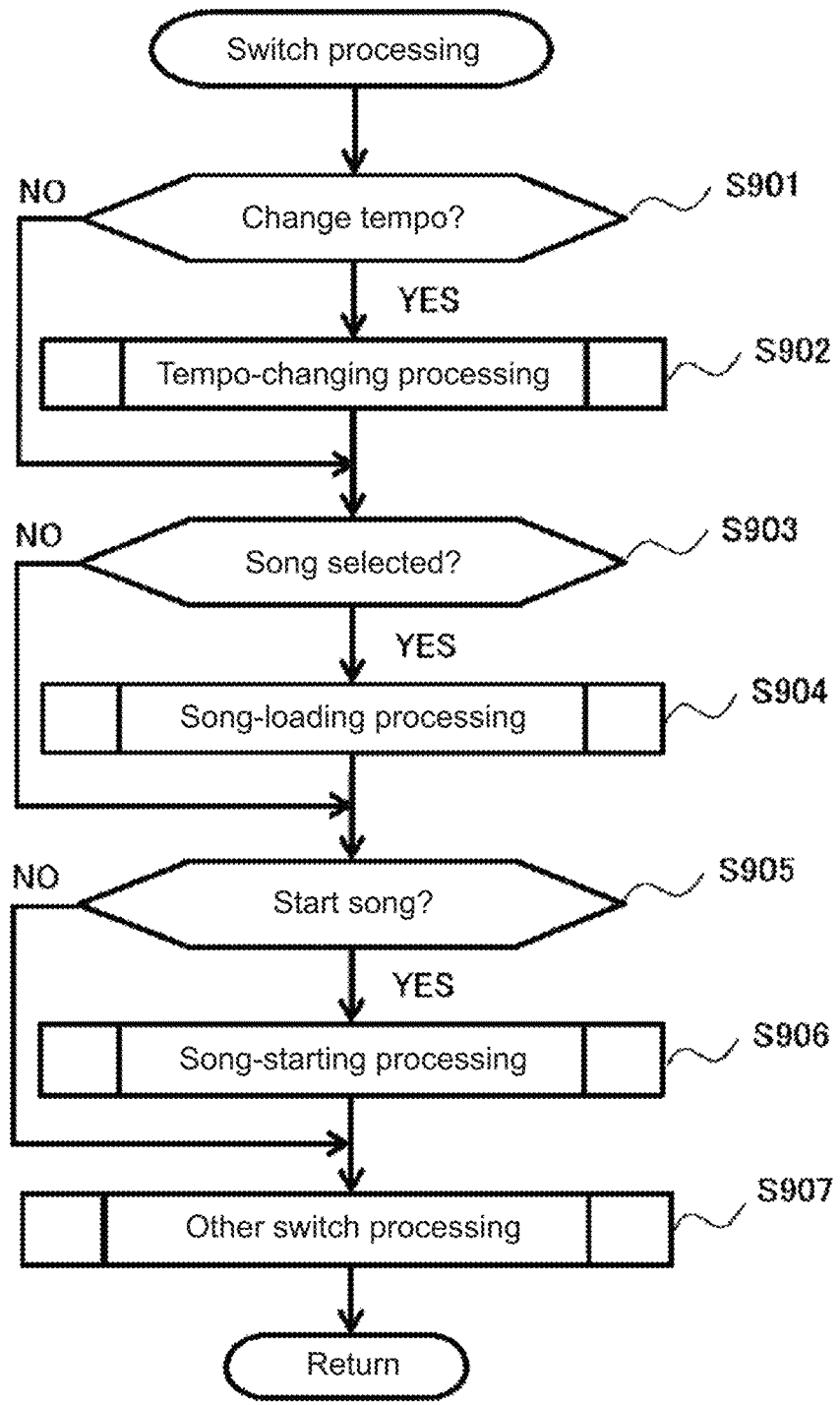
FIG. 9 is a flowchart illustrating a detailed example of switch processing.

FIG. 9 is a flowchart illustrating a detailed example of the switch processing at step S702 in FIG. 7.

First, the CPU 201 determines whether or not the tempo of lyric progression and automatic accompaniment has been changed using a switch for changing tempo on the first switch panel 102 in FIG. 1 (step S901). If this determination is YES, the CPU 201 performs tempo-changing processing (step S902). The details of this processing will be described later using FIG. 8B. If the determination of step S901 is NO, the CPU 201 skips the processing of step S902.

Next, the CPU 201 determines whether or not a song has been selected with the second switch panel 103 in FIG. 1 (step S903). If this determination is YES, the CPU 201 performs song-loading processing (step S904). In this processing, music data having the data structure described in FIG. 6 is loaded into the RAM 203 from the ROM 202 in FIG. 2. Subsequent data access of the first track chunk or the second track chunk in the data structure illustrated in FIG. 6 is performed with respect to the music data that has been loaded into the RAM 203. If the determination of step S903 is NO, the CPU 201 skips the processing of step S904.

Then, the CPU 201 determines whether or not a switch for starting a song on the first switch panel 102 in FIG. 1 has been operated (step S905). If this determination is YES, the CPU 201 performs song-starting processing (step S906). The details of this processing will be described later using FIG. 8C. If the determination of step S905 is NO, the CPU 201 skips the processing of step S906.

Finally, the CPU 201 determines whether or not any other switches on the first switch panel 102 or the second switch panel 103 in FIG. 1 have been operated, and performs processing corresponding to each switch operation (step S907). The CPU 201 subsequently ends the switch processing at step S702 in FIG. 7 illustrated in the flowchart of FIG. 9

FIG. 8B is a flowchart illustrating a detailed example of the tempo-changing processing at step S902 in FIG. 9. As mentioned previously, a change in the tempo value also results in a change in the TickTime (sec). In the flowchart of FIG. 8B, the CPU 201 performs a control process related to changing the TickTime (sec).

Similarly to at step S801 in FIG. 8A, which is performed in the initialization processing at step S701 in FIG. 7, the CPU 201 first calculates the TickTime (sec) by an arithmetic process corresponding to Equation (6) (step S811). It should be noted that the tempo value Tempo that has been changed using the switch for changing tempo on the first switch panel 102 in FIG. 1 is stored in the RAM 203 or the like.

Next, similarly to at step S802 in FIG. 8A, which is performed in the initialization processing at step S701 in FIG. 7, the CPU 201 sets a timer interrupt for the timer 210 in FIG. 2 using the TickTime (sec) calculated at step S811 (step S812). The CPU 201 subsequently ends the tempo-changing processing at step S902 in FIG. 9 illustrated in the flowchart of FIG. 8B

FIG. 8C is a flowchart illustrating a detailed example of the song-starting processing at step S906 in FIG. 9.

First, with regards to the progression of automatic accompaniment, the CPU 201 initializes the values of both a DeltaT_1 (first track chunk) variable and a DeltaT_2 (second track chunk) variable in the RAM 203 for counting, in units of TickTime, relative time since the last event to 0. Next, the CPU 201 initializes the respective values of an AutoIndex_1 variable in the RAM 203 for specifying an i (1≤i≤L−1) for DeltaTime_1[i] and Event_1[i] performance data pairs in the first track chunk of the music data illustrated in FIG. 6, and an AutoIndex_2 variable in the RAM 203 for specifying an i (1≤i≤M−1) for DeltaTime_2[i] and Event_2[i] performance data pairs in the second track chunk of the music data illustrated in FIG. 6, to 0 (the above is step S821). Thus, in the example of FIG. 6, the DeltaTime_1[0] and Event_1[0] performance data pair at the beginning of first track chunk and the DeltaTime_2[0] and Event_2[0] performance data pair at the beginning of second track chunk are both referenced to set an initial state.

Next, the CPU 201 initializes the value of a SongIndex variable in the RAM 203, which designates the current song position, to 0 (step S822).

The CPU 201 also initializes the value of a SongStart variable in the RAM 203, which indicates whether to advance (=1) or not advance (=0) the lyrics and accompaniment, to 1 (progress) (step S823).

Then, the CPU 201 determines whether or not a user has configured the electronic keyboard instrument 100 to playback an accompaniment together with lyric playback using the first switch panel 102 in FIG. 1 (step S824).

If the determination of step S824 is YES, the CPU 201 sets the value of a Bansou variable in the RAM 203 to 1 (has accompaniment) (step S825). Conversely, if the determination of step S824 is NO, the CPU 201 sets the value of the Bansou variable to 0 (no accompaniment) (step S826). After the processing at step S825 or step S826, the CPU 201 ends the song-starting processing at step S906 in FIG. 9 illustrated in the flowchart of FIG. 8C.

Figure 10:
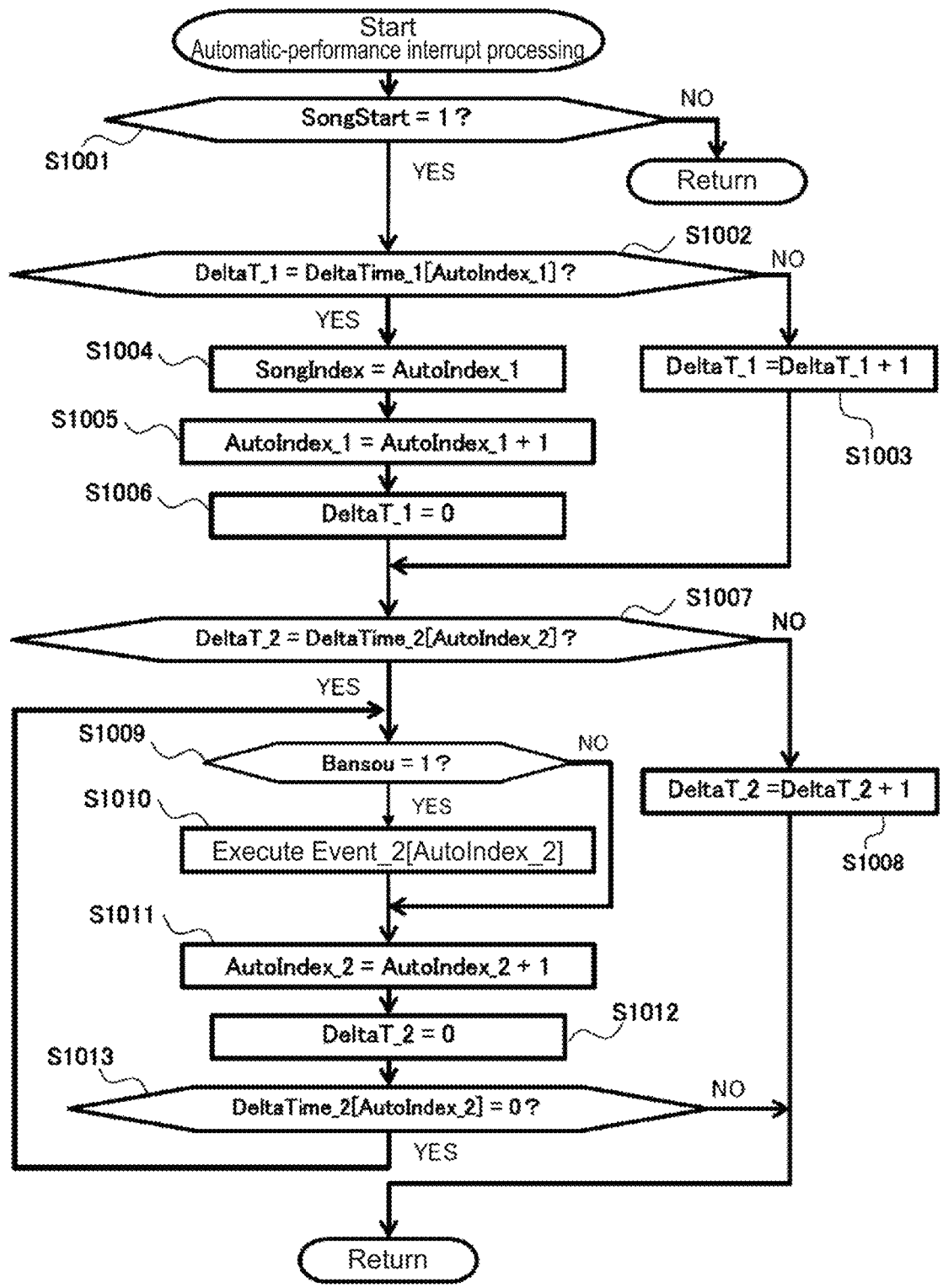
FIG. 10 is a flowchart illustrating a detailed example of automatic-performance interrupt processing.

FIG. 10 is a flowchart illustrating a detailed example of the automatic-performance interrupt processing performed based on the interrupts generated by the timer 210 in FIG. 2 every TickTime (sec) (see step S802 in FIG. 8A, or step S812 in FIG. 8B). The following processing is performed on the performance data pairs in the first and second track chunks in the music data illustrated in FIG. 6.

First, the CPU 201 performs a series of processes corresponding to the first track chunk (steps S1001 to S1006). The CPU 201 starts by determining whether or not the value of SongStart is equal to 1, in other words, whether or not advancement of the lyrics and accompaniment has been instructed (step S1001).

When the CPU 201 has determined there to be no instruction to advance the lyrics and accompaniment (the determination of step S1001 is NO), the CPU 201 ends the automatic-performance interrupt processing illustrated in the flowchart of FIG. 10 without advancing the lyrics and accompaniment.

When the CPU 201 has determined there to be an instruction to advance the lyrics and accompaniment (the determination of step S1001 is YES), the CPU 201 then determines whether or not the value of DeltaT_1, which indicates the relative time since the last event in the first track chunk, matches the wait time DeltaTime_1[AutoIndex_1] of the performance data pair indicated by the value of AutoIndex_1 that is about to be executed (step S1002).

If the determination of step S1002 is NO, the CPU 201 increments the value of DeltaT_1, which indicates the relative time since the last event in the first track chunk, by 1, and the CPU 201 allows the time to advance by 1 TickTime corresponding to the current interrupt (step S1003). Following this, the CPU 201 proceeds to step S1007, which will be described later.

If the determination of step S1002 is YES, the CPU 201 executes the first track chunk event Event-1[AutoIndex_1] of the performance data pair indicated by the value of AutoIndex_1 (step S1004). This event is a song event that includes lyric data.

Then, the CPU 201 stores the value of AutoIndex_1, which indicates the position of the song event that should be performed next in the first track chunk, in the SongIndex variable in the RAM 203 (step S1004).

The CPU 201 then increments the value of AutoIndex_1 for referencing the performance data pairs in the first track chunk by 1 (step S1005).

Next, the CPU 201 resets the value of DeltaT_1, which indicates the relative time since the song event most recently referenced in the first track chunk, to 0 (step S1006). Following this, the CPU 201 proceeds to the processing at step S1007.

Then, the CPU 201 performs a series of processes corresponding to the second track chunk (steps S1007 to S1013). The CPU 201 starts by determining whether or not the value of DeltaT_2, which indicates the relative time since the last event in the second track chunk, matches the wait time DeltaTime_2[AutoIndex_2] of the performance data pair indicated by the value of AutoIndex_2 that is about to be executed (step S1007).

If the determination of step S1007 is NO, the CPU 201 increments the value of DeltaT_2, which indicates the relative time since the last event in the second track chunk, by 1, and the CPU 201 allows the time to advance by 1 TickTime corresponding to the current interrupt (step S1008). The CPU 201 subsequently ends the automatic-performance interrupt processing illustrated in the flowchart of FIG. 10.

If the determination of step S1007 is YES, the CPU 201 then determines whether or not the value of the Bansou variable in the RAM 203 that denotes accompaniment playback is equal to 1 (has accompaniment) (step S1009) (see steps S824 to S826 in FIG. 8C).

If the determination of step S1009 is YES, the CPU 201 executes the second track chunk accompaniment event Event_2[AutoIndex_2] indicated by the value of AutoIndex_2 (step S1010). If the event Event_2[AutoIndex_2] executed here is, for example, a "note on" event, the key number and velocity specified by this "note on" event are used to issue a command to the sound source LSI 204 in FIG. 2 to generate sound for a musical tone in the accompaniment. However, if the event Event_2[AutoIndex_2] is, for example, a "note off" event, the key number and velocity specified by this "note off" event are used to issue a command to the sound source LSI 204 in FIG. 2 to silence a musical tone being generated for the accompaniment.

However, if the determination of step S1009 is NO, the CPU 201 skips step S1010 and proceeds to the processing at the next step S1011 without executing the current accompaniment event Event_2[AutoIndex_2]. Here, in order to progress in sync with the lyrics, the CPU 201 performs only control processing that advances events.

After step S1010, or when the determination of step S1009 is NO, the CPU 201 increments the value of AutoIndex_2 for referencing the performance data pairs for accompaniment data in the second track chunk by 1 (step S1011).

Next, the CPU 201 resets the value of DeltaT_2, which indicates the relative time since the event most recently executed in the second track chunk, to 0 (step S1012).

Then, the CPU 201 determines whether or not the wait time DeltaTime_2[AutoIndex_2] of the performance data pair indicated by the value of AutoIndex_2 to be executed next in the second track chunk is equal to 0, or in other words, whether or not this event is to be executed at the same time as the current event (step S1013).

If the determination of step S1013 is NO, the CPU 201 ends the current automatic-performance interrupt processing illustrated in the flowchart of FIG. 10.

If the determination of step S1013 is YES, the CPU 201 returns to step S1009, and repeats the control processing relating to the event Event_2[AutoIndex_2] of the performance data pair indicated by the value of AutoIndex_2 to be executed next in the second track chunk. The CPU 201 repeatedly performs the processing of steps S1009 to S1013 same number of times as there are events to be simultaneously executed. The above processing sequence is performed when a plurality of "note on" events are to generate sound at simultaneous timings, as for example happens in chords and the like.

Figure 11:
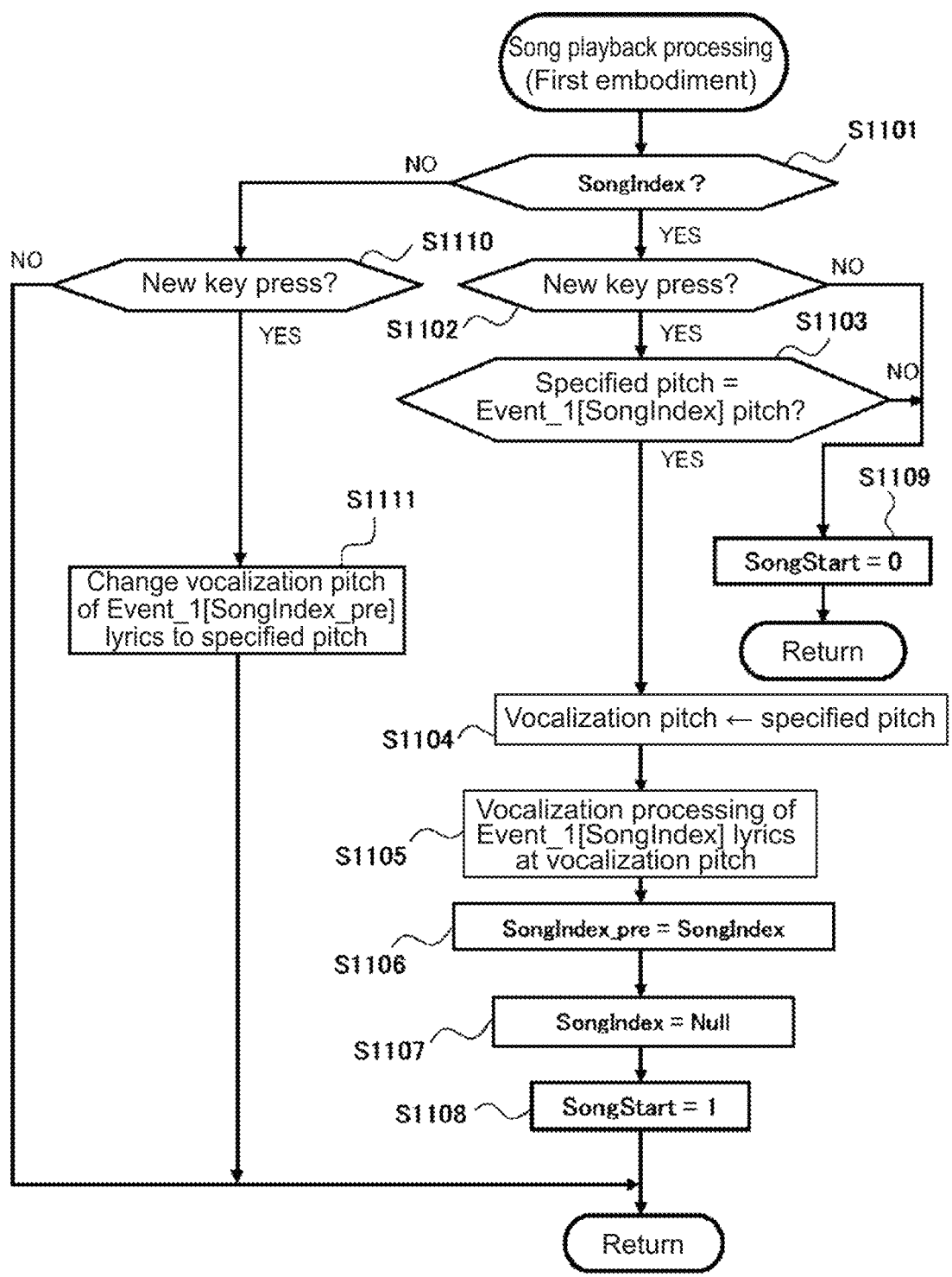
FIG. 11 is a flowchart illustrating a detailed example of a first embodiment of song playback processing.

FIG. 11 is a flowchart illustrating a detailed example of a first embodiment of the song playback processing at step S705 in FIG. 7. This processing implements a control process of the present embodiment described in FIGS. 5A to 5C.

First, at step S1004 in the automatic-performance interrupt processing of FIG. 10, the CPU 201 determines whether or not a value has been set for the SongIndex variable in the RAM 203, and that this value is not a null value (step S1101). The SongIndex value indicates whether or not the current timing is a singing voice playback timing.

If the determination of step S1101 is YES, that is, if the present time is a song playback timing (e.g., t1, t2, t3, t4, t5, t6, t7 in the example of FIG. 5), the CPU 201 then determines whether or not a new user key press on the keyboard 101 in FIG. 1 has been detected by the keyboard processing at step S703 in FIG. 7 (step S1102).

If the determination of step S1102 is YES, the CPU 201 reads a pitch from the song event Event_1[SongIndex] in the first track chunk of the music data in the RAM 203 indicated by the SongIndex variable in the RAM 203, and determines whether or not a pitch specified by a user key press matches the pitch that was read (step S1103).

If the determination of step S1103 is YES, the CPU 201 sets the pitch specified by a user key press to a non-illustrated register, or to a variable in the RAM 203, as a vocalization pitch (step S1104).

Then, the CPU 201 reads the lyric string from the song event Event_1[SongIndex] in the first track chunk of the music data in the RAM 203 indicated by the SongIndex variable in the RAM 203. The CPU 201 generates music data 215 for vocalizing, at the vocalization pitch set to the pitch specified based on key press that was set at step S1104, singing voice inference data for a given singer 217 corresponding to the lyric string that was read, and instructs the voice synthesis LSI 205 to perform vocalization processing (step S1105).

The processing at steps S1104 and S1105 corresponds to the control processing mentioned earlier with regards to the song playback timings t1, t2, t3', t4 in FIG. 5B.

After the processing of step S1105, the CPU 201 stores the song position at which playback was performed indicated by the SongIndex variable in the RAM 203 in a SongIndex_pre variable in the RAM 203 (step S1106).

Next, the CPU 201 clears the value of the SongIndex variable so as to become a null value and makes subsequent timings non-song playback timings (step S1107).

The CPU 201 then sets the value of the SongStart variable in the RAM 203 controlling the advancement of lyrics and automatic accompaniment to 1, denoting advancement (step S1108). The CPU 201 subsequently ends the song playback processing at step S705 in FIG. 7 illustrated in the flowchart of FIG. 11.

As described with regards to timing t3 in FIG. 5B, while the progression of lyrics and automatic accompaniment is stopped, if a pitch specified by performance (key press) at timing t3' matches the pitch that was read from the music data, the determination of step S1101 is YES and the determination of step S1102 is YES, and after the vocalization of the singing voice indicated by Event_1[SongIndex] has been performed at step S1105, the value of the SongStart variable is set to 1 at step S1108 as described above. Consequently, the determination of step S1001 in the automatic-performance interrupt processing of FIG. 10 is YES, and the advancement of lyrics and automatic accompaniment is resumed.

If the determination of step S1103 is NO, that is, if the pitch specified by a user key press does not match the pitch read from the music data, the CPU 201 sets the value of the SongStart variable in the RAM 203 controlling the advancement of lyrics and automatic accompaniment to 0, denoting that advancement is to stop (step S1109). The CPU 201 subsequently ends the song playback processing at step S705 in FIG. 7 illustrated in the flowchart of FIG. 11.

As described with regards to timing t3 in FIG. 5B, if a pitch specified by performance (key press) at the singing voice vocalization timing t3 does not match the pitch that was read from the music data, the determination of step S1101 is YES, the determination of step S1102 is YES, and the determination of step S1103 is NO, and the value of the SongStart variable is set to 0 at step S1109 as described above. Consequently, the determination of step S1001 in the automatic-performance interrupt processing of FIG. 10 is NO, and the progression of lyrics and automatic accompaniment is stopped.

If the determination of step S1101 is NO, that is, if the present time is not a song playback timing, the CPU 201 then determines whether or not a new user key press on the keyboard 101 in FIG. 1 has been detected by the keyboard processing at step S703 in FIG. 7 (step S1110).

If the determination of step S1110 is NO, the CPU 201 ends the song playback processing at step S705 in FIG. 7 illustrated in the flowchart of FIG. 11.

If the determination of step S1110 is YES, the CPU 201 generates music data 215 instructing that the pitch of singing voice inference data for a given singer 217 currently undergoing vocalization processing in the voice synthesis LSI 205, which corresponds to the lyric string for song event Event_1[SongIndex_pre] in the first track chunk of the music data in the RAM 203 indicated by the SongIndex_pre variable in the RAM 203, is to be changed to the pitch specified based on the user key press detected at step S1110, and outputs the music data 215 to the voice synthesis LSI 205 (step S1111). At such time, the frame in the music data 215 where a latter phoneme among phonemes in the lyrics already being subjected to vocalization processing starts, for example, in the case of the lyric string "Ki", the frame where the latter phoneme /i/ in the constituent phoneme sequence /k/ /i/ starts (see (b) and (c) in FIG. 4) is set as the starting point for changing to the specified pitch.

Due to the processing at step S1111, the pitch of the vocalization of singing voice inference data for a given singer 217 being vocalized from an original timing immediately before the current key press timing, for example from timing t1 in FIG. 5B, is able to be changed to the pitch specified by the user and continue being vocalized at, for example, the current key press timing t1' in FIG. 5B.

After the processing at step S1111, the CPU 201 ends the song playback processing at step S705 in FIG. 7 illustrated in the flowchart of FIG. 11.

Figure 12:
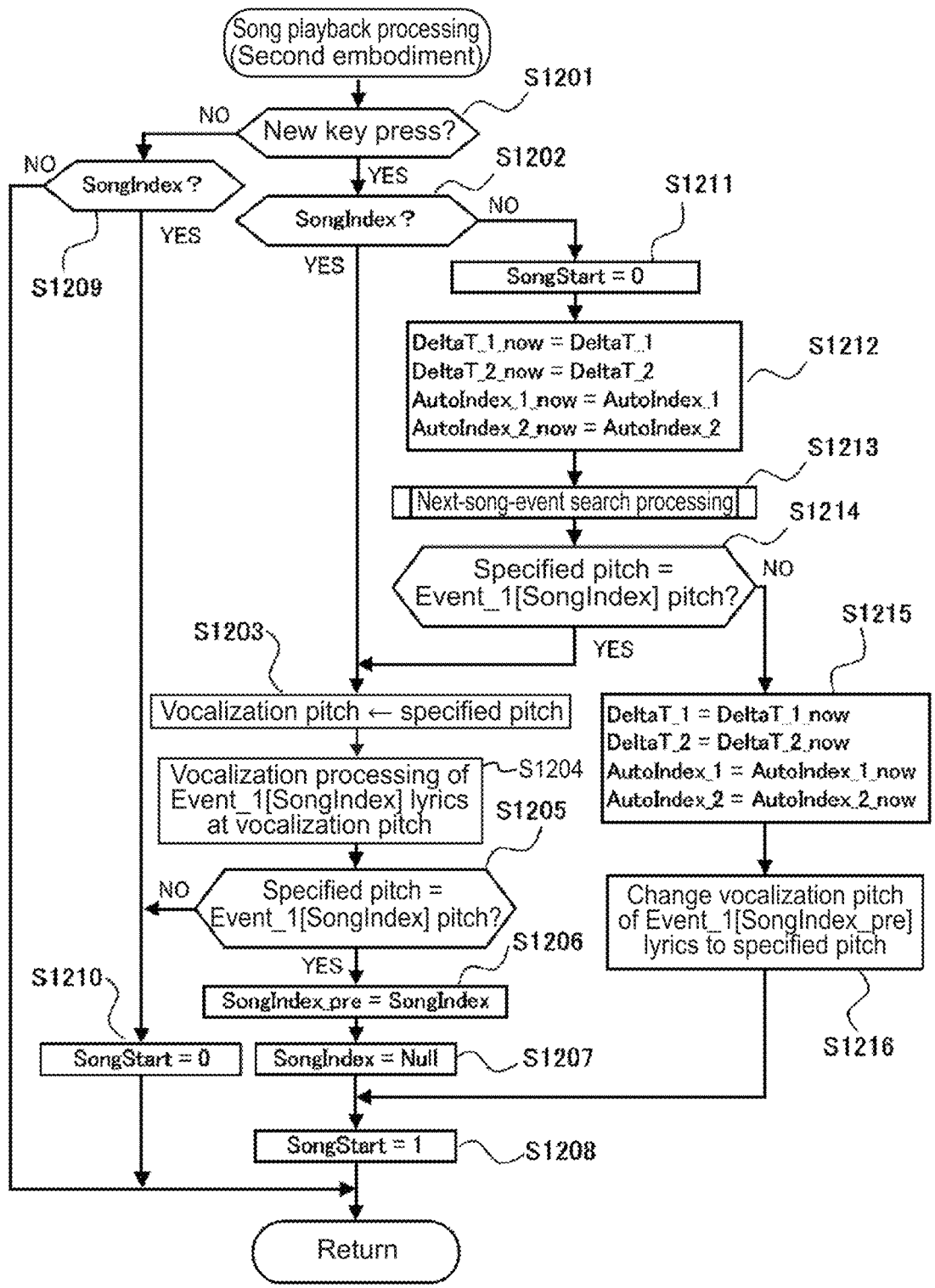
FIG. 12 is a flowchart illustrating a detailed example of a second embodiment of song playback processing.

FIG. 12 is a flowchart illustrating a detailed example of a second embodiment of the song playback processing at step S705 in FIG. 7. This processing implements another one of the control processes of the present embodiment described in FIGS. 5A through 5C.

First, the CPU 201 determines whether or not a new user key press on the keyboard 101 in FIG. 1 has been detected by the keyboard processing at step S703 in FIG. 7 (step S1201).

If the determination of step S1201 is YES, the CPU 201 then determines whether or not, at step S1004 in the automatic-performance interrupt processing of FIG. 10, a value was set for the SongIndex variable in the RAM 203 that indicates whether or not the current timing is a singing voice playback timing, and that this value is not a null value (step S1202).

If the determination of step S1202 is YES, that is, if the present time is a song playback timing (e.g., t1, t2, t3, t4 in the example of FIGS. 5A through 5C), the CPU 201 sets the pitch specified by a user key press to a non-illustrated register, or to a variable in the RAM 203, as a vocalization pitch (step S1203).

Then, the CPU 201 reads the lyric string from the song event Event_1[SongIndex] in the first track chunk of the music data in the RAM 203 indicated by the SongIndex variable in the RAM 203. The CPU 201 generates music data 215 for vocalizing, at the vocalization pitch set to the pitch specified based on key press that was set at step S1203, singing voice inference data for a given singer 217 corresponding to the lyric string that was read, and instructs the voice synthesis LSI 205 to perform vocalization processing (step S1204).

Following this, the CPU 201 reads a pitch from the song event Event_1[SongIndex] in the first track chunk of the music data in the RAM 203 indicated by the SongIndex variable in the RAM 203, and determines whether or not a specified pitch specified by a user key press matches the pitch that was read from the music data (step S1205).

If the determination of step S1205 is YES, the CPU 201 advances to step S1206. This processing corresponds to the control processing mentioned earlier with regards to the song playback timings t1, t2, t3', t4 in FIG. 5B.

At step S1206, the CPU 201 stores the song position at which playback was performed indicated by the SongIndex variable in the RAM 203 in the SongIndex_pre variable in the RAM 203.

Next, the CPU 201 clears the value of the SongIndex variable so as to become a null value and makes subsequent timings non-song playback timings (step S1207).

The CPU 201 then sets the value of the SongStart variable in the RAM 203 controlling the advancement of lyrics and automatic accompaniment to 1, denoting advancement (step S1208). The CPU 201 subsequently ends the song playback processing at step S705 in FIG. 7 illustrated in the flowchart of FIG. 12.

If the determination of step S1205 is NO, that is, if the pitch specified by a user key press does not match the pitch read from the music data, the CPU 201 sets the value of the SongStart variable in the RAM 203 controlling the advancement of lyrics and automatic accompaniment to 0, denoting that advancement is to stop (step S1210).

The CPU 201 subsequently ends the song playback processing at step S705 in FIG. 7 illustrated in the flowchart of FIG. 12. Accordingly, the determination of step S1001 in the automatic-performance interrupt processing of FIG. 10 is NO and the progression of lyrics and automatic accompaniment is stopped similarly to at step S1109 in FIG. 11.

This processing corresponds to the control processing mentioned earlier with regards to the song playback timing t3 in FIG. 5B.

When the determination of step S1201 is YES and the determination of step S1202 is NO, that is, when a user performance (key press) is vocalized at a timing other than a timing at which a singing voice should be vocalized, the following processing is performed.

First, the CPU 201 sets the value of the SongStart variable in the RAM 203 to 0 and momentarily stops the progression of a singing voice and automatic accompaniment (step S1211) (see step S1001 in FIG. 10).

Next, the CPU 201 saves the values of the DeltaT_1, DeltaT_2, AutoIndex_1, and AutoIndex_2 variables in the RAM 203, which relate to the current positions of singing voice and automatic accompaniment progression, to the DeltaT_1 now, DeltaT_2 now, AutoIndex_1 now, and AutoIndex_2 now variables (step S1212).

Then, the CPU 201 performs next-song-event search processing (step S1213). This processing finds the SongIndex value that designates event information relating to the singing voice that will come next. The details of this processing will be described later.

Following the search process at step S1213, the CPU 201 reads a pitch from the song event Event_1[SongIndex] in the first track chunk of the music data in the RAM 203 indicated by the value of the SongIndex variable that was found, and determines whether or not the pitch specified by the user key press matches the pitch that was read (step S1214).

If the determination of step S1214 is YES, the CPU 201 advances the control processing through step S1203, step S1204, step S1205 (determination: YES), step S1206, step S1207, and step S1208.

Due to the aforementioned series of control processes, in cases where, at a timing at which no original vocalization timing comes, a user has pressed a key having the same pitch as the pitch that is to be vocalized next, the CPU 201 is able to enact control such that the progression of lyrics and the progression of automatic accompaniment are immediately advanced (made to jump ahead) to the timing of the singing voice that is to be vocalized next.

If the determination of step S1214 is NO, the CPU 201 respectively restores the values of the DeltaT_1, DeltaT_2, AutoIndex_1, and AutoIndex_2 variables to the values held by the DeltaT_1 now, DeltaT_2 now, AutoIndex_1 now, and AutoIndex_2 now variables in the RAM 203 that were saved at step S1212, and any advancement of these variables due to the search process at step S1213 is reverted so as to return to the progression positions from before the search (step S1215).

Then, the CPU 201 generates music data 215 instructing that the pitch of singing voice inference data for a given singer 217 currently undergoing vocalization processing in the voice synthesis LSI 205, which corresponds to the lyric string for song event Event_1[SongIndex_pre] in the first track chunk of the music data in the RAM 203 indicated by the SongIndex_pre variable in the RAM 203, is to be changed to the pitch specified based on the user key press detected at step S1201, and outputs the music data 215 to the voice synthesis LSI 205 (step S1216).

The processing at step S1216 is similar to the processing of step S1111 in FIG. 11. With this processing, the pitch of vocalization of singing voice inference data for a given singer 217 being vocalized from an original timing immediately before the current key press timing, for example from timing t1 in FIG. 5B, is able to be changed to the specified pitch that was performed by the user and continue being vocalized at, for example, the current key press timing t1' in FIG. 5B.

After the processing at step S1216, the CPU 201 sets the value of the SongStart variable in the RAM 203 to 1, thereby causing the progression of lyrics and automatic accompaniment that was temporarily stopped at step S1211 to be resumed (step S1208). The CPU 201 subsequently ends the song playback processing at step S705 in FIG. 7 illustrated in the flowchart of FIG. 12.

If the determination of step S1201 is NO, that is, when there are no user performances (key presses), the CPU 201 then determines whether or not, at step S1004 in the automatic-performance interrupt processing of FIG. 10, a value was set for the SongIndex variable in the RAM 203 that indicates whether or not the current timing is a singing voice playback timing, and that this value is not a null value (step S1209).

If the determination of step S1209 is NO, the CPU 201 ends the song playback processing at step S705 in FIG. 7 illustrated in the flowchart of FIG. 12.

If the determination of step S1209 is YES, the CPU 201 sets the value of SongStart variable in the RAM 203 controlling the advancement of lyrics and automatic accompaniment to 0, denoting that advancement is to stop (step S1210). The CPU 201 subsequently ends the song playback processing at step S705 in FIG. 7 illustrated in the flowchart of FIG. 12. Accordingly, the determination of step S1001 in the automatic-performance interrupt processing of FIG. 10 is NO and the progression of lyrics and automatic accompaniment is stopped similarly to at step S1109 in FIG. 11.

Figure 13:
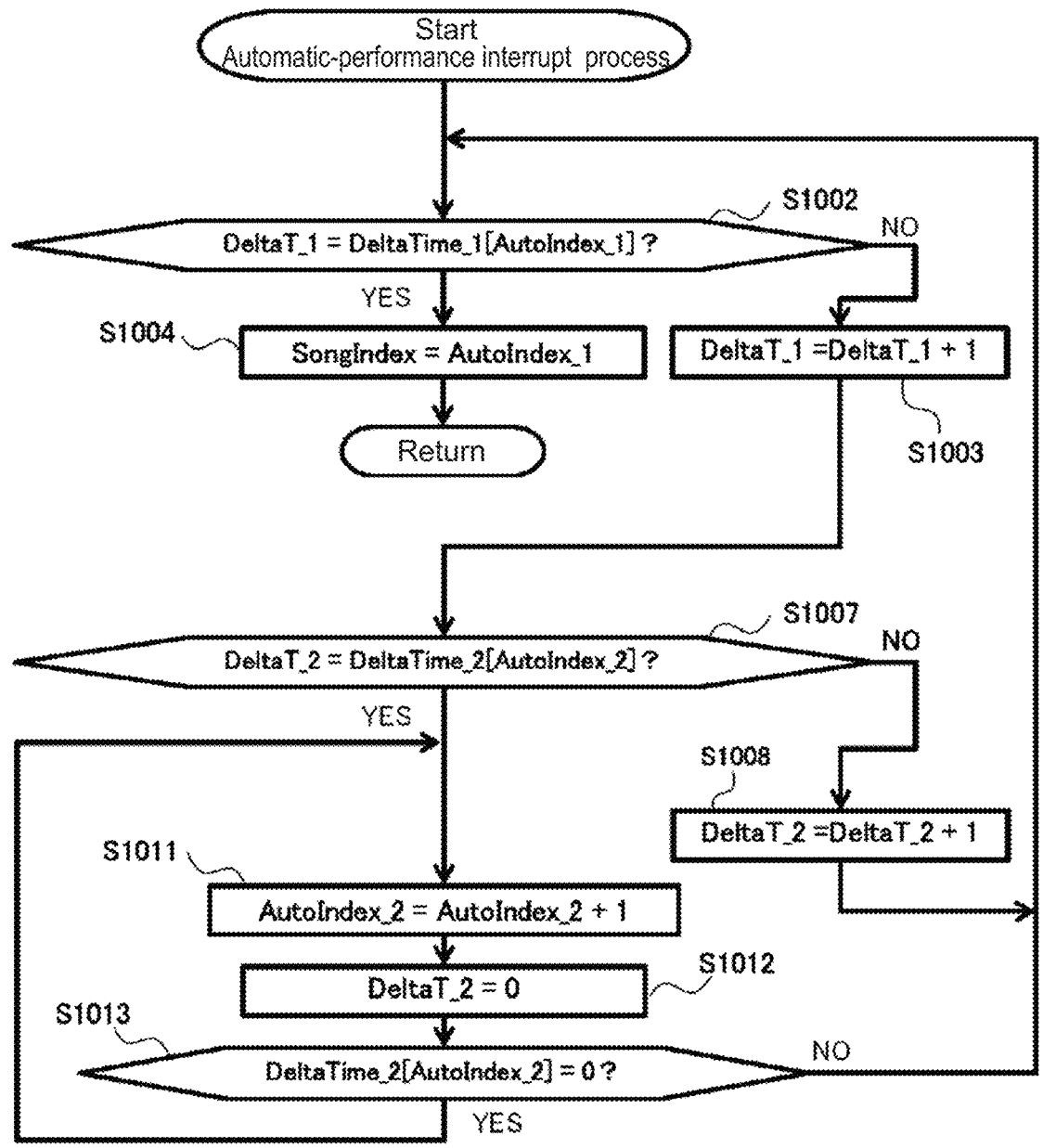
FIG. 13 is a flowchart illustrating a detailed example of next-song-event search processing.

FIG. 13 is a flowchart illustrating a detailed example of the next-song-event search processing at step S1213 in FIG. 12. Steps in the flowchart of FIG. 13 having the same step number as a step in the automatic-performance interrupt processing of FIG. 10 indicate processes that are identical to that in FIG. 10. The processing in FIG. 13 essentially has the same control flow as the control flow sequence from step S1002 to step S1013 in the automatic-performance interrupt processing of FIG. 10. However, in FIG. 13, only the set of control processes that do not execute events are performed.

In other words, in FIG. 13, until the value of DeltaT_1 at step S1002, which indicates the relative time since the last event in the first track chunk, is determined to match the wait time DeltaTime_1[AutoIndex_1] of the singing voice performance data pair indicated by the value of AutoIndex_1 that is about to be executed, the CPU 201 increments the value of DeltaT_1 at step S1003 to advance the progression of the singing voice.

Whenever the value of DeltaT_2, which indicates the relative time since the last event in the second track chunk, matches the wait time DeltaTime_2[AutoIndex_2] of the automatic accompaniment performance data pair indicated by the value of AutoIndex_2 that is about to be executed and the determination of step S1007 is YES, the CPU 201 advances the value of AutoIndex_2. When the determination of step S1007 is NO, the CPU 201 increments the value of DeltaT_2 to advance the progression of automatic accompaniment, and then returns to the control processing at step S1002.

In the foregoing series of repeating control processes, when the determination of step S1002 is YES, the CPU 201 stores the value of AutoIndex_1 in the SongIndex variable in the RAM 203, and then ends the next-song-event search processing at step S1213 in FIG. 12 illustrated in the flowchart of FIG. 13.

Figure 15:
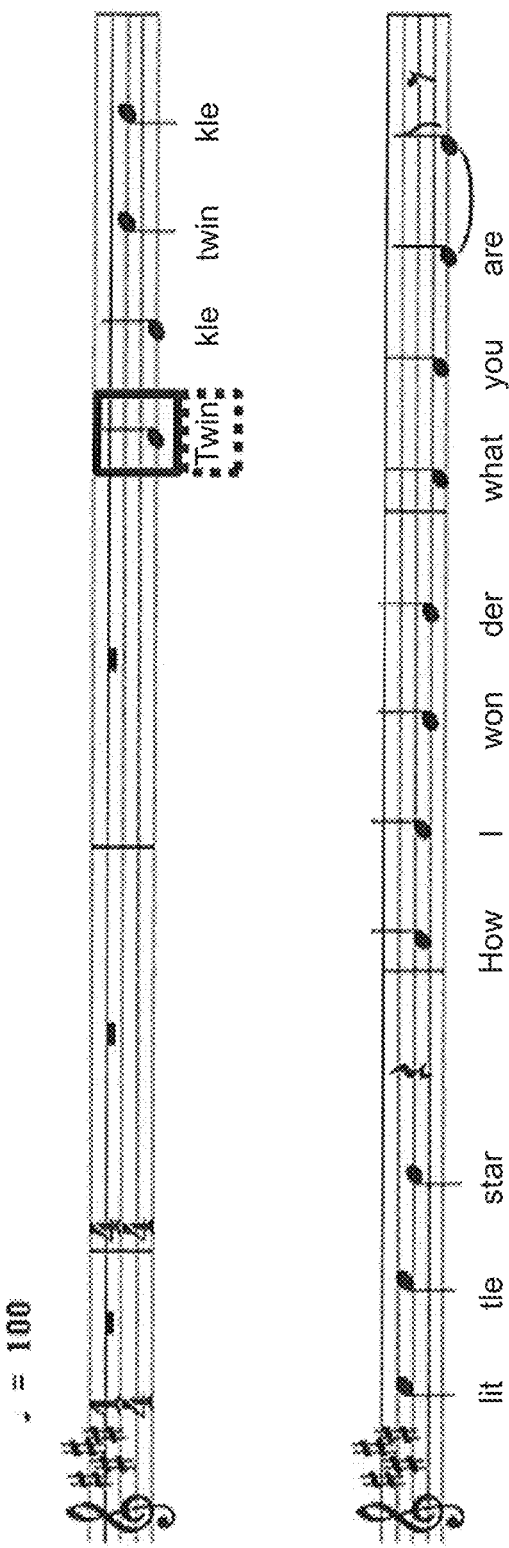
FIG. 15 illustrates an example of musical score display using lyric control data in the MusicXML format.

FIG. 14 illustrates an example configuration of music data having, for example, the data structure depicted in FIG. 6 when implemented in the MusicXML format. With this kind of data structure, musical score data including lyric strings and a melody can be held in the music data. Further, having the CPU 201 parse this kind of music data in, for example, the display processing at step S704 in FIG. 7 enables functionality to be provided whereby, for example, on the keyboard 101 in FIG. 1, keys for a melody corresponding to a lyric string in a song being played back are illuminated so as to guide the user in pressing keys corresponding to the lyric string. At the same time, the lyric strings in the song being played back and the corresponding musical score may be displayed in the LCD 104 in FIG. 1, as in a display example illustrated in FIG. 15. In other words, in order to induce a user to operate, from among a plurality of operation elements, a first operation element associated with a first tone at a timing corresponding to a first timing in the music data, a light source contained in the first operation element is illuminated starting at a timing that comes before the first timing, and light sources contained in operation elements other than the first operation element are not illuminated.

As used in the present specification, a "timing corresponding to a first timing" is a timing at which a user operation on the first operation element is received, and refers to an interval of a predetermined duration prior to the first timing.

Further, as used in the present specification, character(s) such as the "first character(s)" and the "second character(s)" denote character(s) associated with a single musical note, and may be either single characters or multiple characters.

Moreover, while an electronic musical instrument is outputting a singing voice corresponding to a first character(s) and a first pitch based on a first user operation for the first pitch in time with a first timing indicated in music data, and prior to the arrival of a second timing indicated in the music data, in cases where, rather than being performed on an operation element for a second pitch associated with the second timing, a second user operation is performed on the operation element for the first pitch that is being output (in other words, the same operation element is struck in succession), the output of the singing voice for the first character(s) is continued without a singing voice for the second character(s) associated with the second timing being output. At such time, vibrato or another musical effect may be applied to the singing voice for the first character(s) that is being output. When the operation element subjected to the second user operation is an operation element for the second pitch, the singing voice for the second character(s) to be output on or after the second timing is output before the arrival of the second timing. As a result, the lyrics advance, and in accordance with the lyric progression, the accompaniment also advances.

In the embodiments described above, in order to predict an acoustic feature sequence 317 from a linguistic feature sequence 316, the acoustic model unit 306 is implemented using a deep neural network (DNN). Alternatively, in order to make this prediction, the acoustic model unit 306 may be implemented using a hidden Markov model (HMM). In such case, the model training unit 305 in the voice training section 301 trains a model that considers context so as to more accurately model the acoustic features of a voice. To model acoustic features in detail, in addition to preceding and following phonemes, factors such as accent, part of speech, and phrase length are taken into account. However, since there are a large number of possible contextual combinations, it is not easy to prepare singing voice data with which a context-dependent model can be accurately trained on all contextual combinations. To address this issue, the model training unit 305 may employ decision-tree based context clustering techniques. In decision-tree based context clustering, questions relating to context, such as "Is the preceding phoneme /a/?", are used to classify context-dependent models, and model parameters for similar contexts are set in the acoustic model unit 306 as training results 315. The context being considered changes depending on the structure of the decision tree. Thus, by selecting the appropriate decision tree structure, highly accurate and highly versatile context-dependent models can be estimated. In the acoustic model unit 306 in the voice synthesis section 302 in FIG. 3, context-dependent HMMs are concatenated in accordance with the linguistic feature sequence 316 extracted from the music data 215 by the text analysis unit 307, and the acoustic feature sequence 317 with the greatest output probability is predicted.

In the embodiments described above, the present invention is embodied as an electronic keyboard instrument. However, the present invention can also be applied to electronic string instruments and other electronic musical instruments.

The present invention is not limited to the embodiments described above, and various changes in implementation are possible without departing from the spirit of the present invention. Insofar as possible, the functionalities performed in the embodiments described above may be implemented in any suitable combination. Moreover, there are many aspects to the embodiments described above, and the invention may take on a variety of forms through the appropriate combination of the disclosed plurality of constituent elements. For example, if after omitting several constituent elements from out of all constituent elements disclosed in the embodiments the advantageous effect is still obtained, the configuration from which these constituent elements have been omitted may be considered to be one form of the invention.

What is claimed is:

1. An electronic musical instrument comprising:
   a performance receiver having a plurality of operation elements to be performed by a user for respectively specifying different pitches of musical notes;
   a memory that stores musical piece data that includes data of a vocal part, the vocal part including at least first and second notes and respectively associated first and second lyric parts that are to be successively played in the order of the first note and then the second note, wherein the first note has a first pitch and the second note has a second pitch; and
   at least one processor,
   wherein the at least one processor performs the following:
      when the user specifies, via the performance receiver, the first pitch,
         digitally synthesizing a first singing voice that includes the first lyric part and that has the first pitch in accordance with data of the first note stored in the memory, and
         causing the digitally synthesized first singing voice to be audibly output; and
      if the user specifies, via the performance receiver, a third pitch that is different from the second pitch successively after specifying the first pitch, instead of the second pitch of the second note that should have been specified,
         synthesizing a modified first singing voice that has the third pitch in accordance with data of the first lyric part, and
         causing the digitally synthesized modified first singing voice to be audibly output without causing the second lyric part of the second note to be audibly output.

2. The electronic musical instrument according to claim 1, wherein the first lyric part and the second lyric part respectively have one more characters.

3. The electronic musical instrument according to claim 1, wherein if the third pitch is different from the first pitch, the at least one processor synthesizes the modified first singing voice such that a pitch of the digitally synthesized first singing voice that is being output is changed to the third pitch from the first pitch.

4. The electronic musical instrument according to claim 1, wherein the at least one processor performs the following:
   if instead of the third pitch, the user specifies, via the performance receiver, the second pitch successively after specifying the first pitch,
      digitally synthesizing a second singing voice that includes the second lyric part and that has the second pitch in accordance with data of the second note stored in the memory, and causing the digitally synthesized second singing voice to be audibly output.

5. The electronic musical instrument according to claim 1, wherein the memory stores a trained acoustic model obtained using a machine learning process that employs musical score data including training lyric data and training pitch data, and singing voice data for a singer corresponding to the musical score data, the trained acoustic model being input with prescribed lyric data and prescribed pitch data and outputting data indicating acoustic features of the singing voice of the given singer, and wherein in singing voice syntheses, the at least one processor digitally synthesizes singing voices of the singer based on the data indicating acoustic features of the singing voice of the given singer output by the trained acoustic model in accordance with the input of the prescribed lyric data and the prescribed pitch data to the trained acoustic model.

6. The electronic musical instrument according to claim 4, wherein the musical piece data in the memory further includes data of an accompaniment part, and wherein the at least one processor causes the accompaniment part to be audibly output while accepting operations of the performance receiver by the user, and the at least one processor causes the output of the accompaniment part to be in synchronization with timings at which the first singing voice and the second singing voice are output.

7. The electronic musical instrument according to claim 5, wherein the trained acoustic model includes a model subjected to the machine learning process using at least one of a deep neural network or a hidden Markov model.

8. A method performed by at least one processor in an electronic musical instrument that includes, in addition to the at least one processor: a performance receiver having a plurality of operation elements to be performed by a user for respectively specifying different pitches of musical notes; and a memory that stores musical piece data that includes data of a vocal part, the vocal part including at least first and second notes and respectively associated first and second lyric parts that are to be successively played in the order of the first note and then the second note, wherein the first note has a first pitch and the second note has a second pitch, the method comprising, via the at least one processor:

when the user specifies, via the performance receiver, the first pitch, digitally synthesizing a first singing voice that includes the first lyric part and that has the first pitch in accordance with data of the first note stored in the memory, and causing the digitally synthesized first singing voice to be audibly output; and if the user specifies, via the performance receiver, a third pitch that is different from the second pitch successively after specifying the first pitch, instead of the second pitch of the second note that should have been specified, synthesizing a modified first singing voice that has the third pitch in accordance with data of the first lyric part, and causing the digitally synthesized modified first singing voice to be audibly output without causing the second lyric part of the second note to be audibly output.

9. The method according to claim 8, wherein the first lyric part and the second lyric part respectively have one more characters.

10. The method according to claim 8, wherein if the third pitch is different from the first pitch, the modified first singing voice is synthesized such that a pitch of the digitally synthesized first singing voice that is being output is changed to the third pitch from the first pitch.

11. The method according to claim 8, wherein the method further comprises, via the at least one processor, the following:

if instead of the third pitch, the user specifies, via the performance receiver, the second pitch successively after specifying the first pitch, digitally synthesizing a second singing voice that includes the second lyric part and that has the second pitch in accordance with data of the second note stored in the memory, and causing the digitally synthesized second singing voice to be audibly output.

12. The method according to claim 11, wherein the musical piece data in the memory further includes data of an accompaniment part, and wherein the method further comprises, via the at least one processor, causing the accompaniment part to be audibly output while accepting operations of the performance receiver by the user, and causing the output of the accompaniment part to be in synchronization with timings at which the first singing voice and the second singing voice are output.

13. The method according to claim 8, wherein the memory stores a trained acoustic model obtained using a machine learning process that employs musical score data including training lyric data and training pitch data, and singing voice data for a singer corresponding to the musical score data, the trained acoustic model being input with prescribed lyric data and prescribed pitch data and outputting data indicating acoustic features of the singing voice of the given singer, and wherein in singing voice syntheses, corresponding singing voices of the singer are digitally synthesized based on the data indicating acoustic features of the singing voice of the given singer output by the trained acoustic model in accordance with the input of the prescribed lyric data and the prescribed pitch data to the trained acoustic model.

14. The method according to claim 13, wherein the trained acoustic model includes a model subjected to the machine learning process using at least one of a deep neural network or a hidden Markov model.

15. A non-transitory computer-readable storage medium having stored thereon a program executable by at least one processor in an electronic musical instrument that includes, in addition to the at least one processor: a performance receiver having a plurality of operation elements to be performed by a user for respectively specifying different pitches of musical notes; and a memory that stores musical piece data that includes data of a vocal part, the vocal part including at least first and second notes and respectively associated first and second lyric parts that are to be successively played in the order of the first note and then the second note, wherein the first note has a first pitch and the second note has a second pitch, the program causing the at least one processor to perform the following:

when the user specifies, via the performance receiver, the first pitch, digitally synthesizing a first singing voice that includes the first lyric part and that has the first pitch in accordance with data of the first note stored in the memory, and causing the digitally synthesized first singing voice to be audibly output; and if the user specifies, via the performance receiver, a third pitch that is different from the second pitch successively after specifying the first pitch, instead of the second pitch of the second note that should have been specified, synthesizing a modified first singing voice that has the third pitch in accordance with data of the first lyric part, and causing the digitally synthesized modified first singing voice to be audibly output without causing the second lyric part of the second note to be audibly output.

* * * * *